United States Patent
Tsuchimoto et al.

(10) Patent No.: US 11,014,601 B2
(45) Date of Patent: May 25, 2021

(54) ELECTRIC POWER STEERING APPARATUS AND METHOD FOR CONTROLLING ELECTRIC POWER STEERING

(71) Applicant: Mitsubishi Electric Corporation, Tokyo (JP)

(72) Inventors: Yuya Tsuchimoto, Tokyo (JP); Isao Kezobo, Tokyo (JP); Akira Furukawa, Tokyo (JP); Yuji Takatsuka, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 46 days.

(21) Appl. No.: 16/604,015

(22) PCT Filed: May 18, 2017

(86) PCT No.: PCT/JP2017/018708
§ 371 (c)(1),
(2) Date: Oct. 9, 2019

(87) PCT Pub. No.: WO2018/211666
PCT Pub. Date: Nov. 22, 2018

(65) Prior Publication Data
US 2020/0062297 A1 Feb. 27, 2020

(51) Int. Cl.
*B62D 5/04* (2006.01)
*H02P 6/17* (2016.01)
(Continued)

(52) U.S. Cl.
CPC .............. *B62D 5/046* (2013.01); *H02P 6/17* (2016.02); *H02P 6/181* (2013.01); *H02P 21/18* (2016.02)

(58) Field of Classification Search
CPC ......... B62D 5/046; B62D 5/0463; H02P 6/17; H02P 21/18; H02P 6/181
See application file for complete search history.

(56) References Cited

U.S. PATENT DOCUMENTS 5,612,877 A * 3/1997 Shimizu .............. B62D 5/0463
180/446
5,992,557 A * 11/1999 Nakamura ........... B62D 5/0463
180/443
(Continued)

FOREIGN PATENT DOCUMENTS

JP 2010-213550 A 9/2010
JP 4672236 B2 4/2011
JP 5837230 B2 12/2015

OTHER PUBLICATIONS

International Search Report for PCT/JP2017/018708 dated Jul. 25, 2017 (PCT/ISA/210).

*Primary Examiner* — Bickey Dhakal
(74) *Attorney, Agent, or Firm* — Sughrue Mion, PLLC; Richard C. Turner

(57) ABSTRACT

An electric power steering apparatus including: a steering torque detector to detect a steering torque of a driver; a motor to assist a steering force of the driver; an estimated speed calculator to calculate an estimated speed, which is an estimated value of a rotation speed of the motor; an estimated speed corrector to correct the estimated speed based on the steering torque; an estimated angle calculator to calculate an estimated angle of the motor by integrating the estimated speed after the correction; and an electric power supply to supply electric power to the motor based on the estimated angle, wherein the estimated speed corrector corrects the estimated speed when a determination signal, which is based on a value obtained by removing a frequency component of steering of the driver from a derivative of the steering torque, the steering torque, and the estimated speed have the same signs.

19 Claims, 17 Drawing Sheets

(51) Int. Cl.
*H02P 21/18* (2016.01)
*H02P 6/18* (2016.01)

(56) References Cited

U.S. PATENT DOCUMENTS

| | | | |
|---|---|---|---|
| 6,148,948 A * | 11/2000 | Shimizu | B62D 5/0463 |
| | | | 180/446 |
| 7,913,805 B2 * | 3/2011 | Tomita | B62D 5/046 |
| | | | 180/446 |
| 9,387,876 B2 * | 7/2016 | Kojo | B62D 6/008 |
| 9,630,649 B2 * | 4/2017 | Kimpara | B62D 5/0472 |
| 2019/0389506 A1 * | 12/2019 | Tsuchimoto | B62D 5/008 |

* cited by examiner

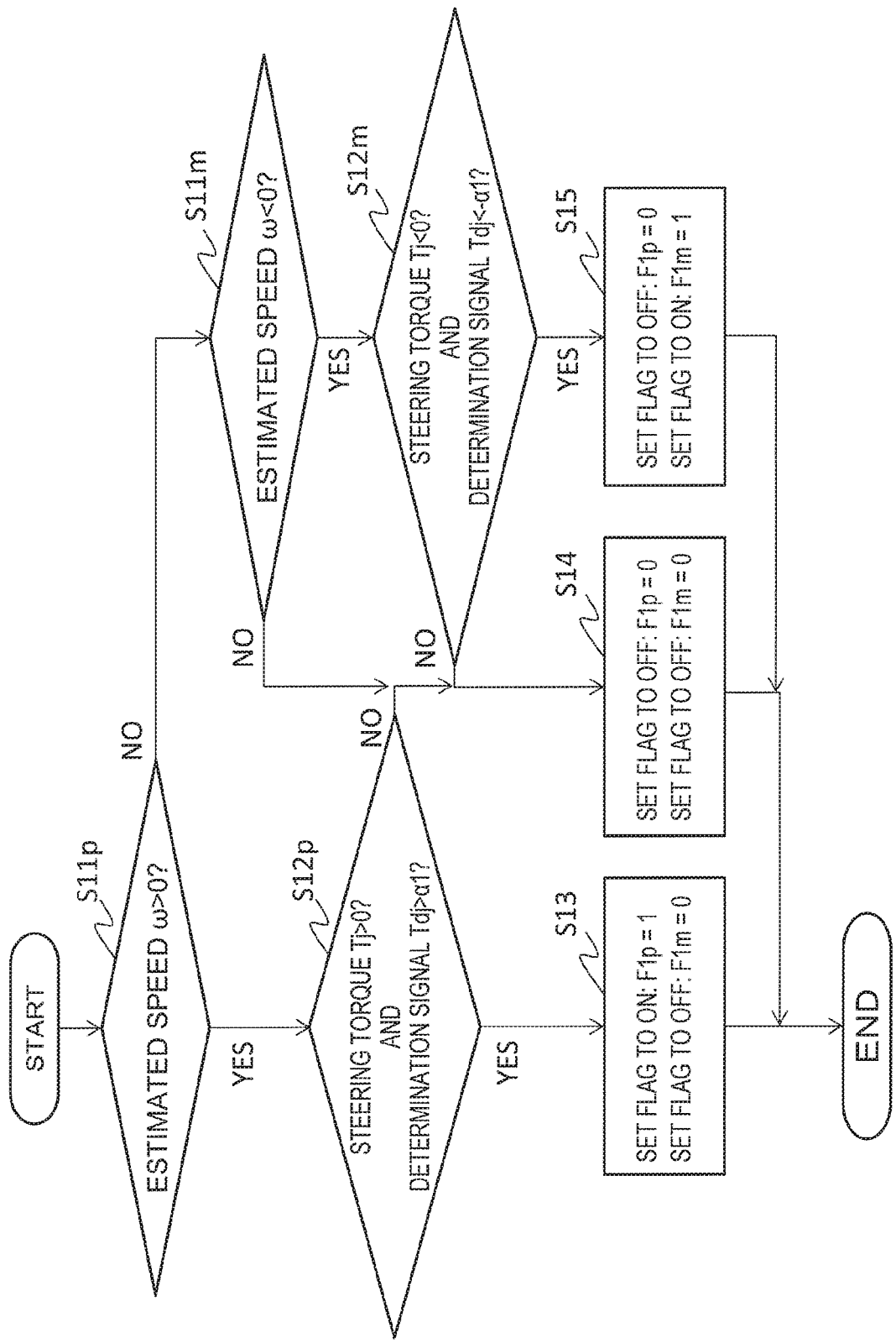

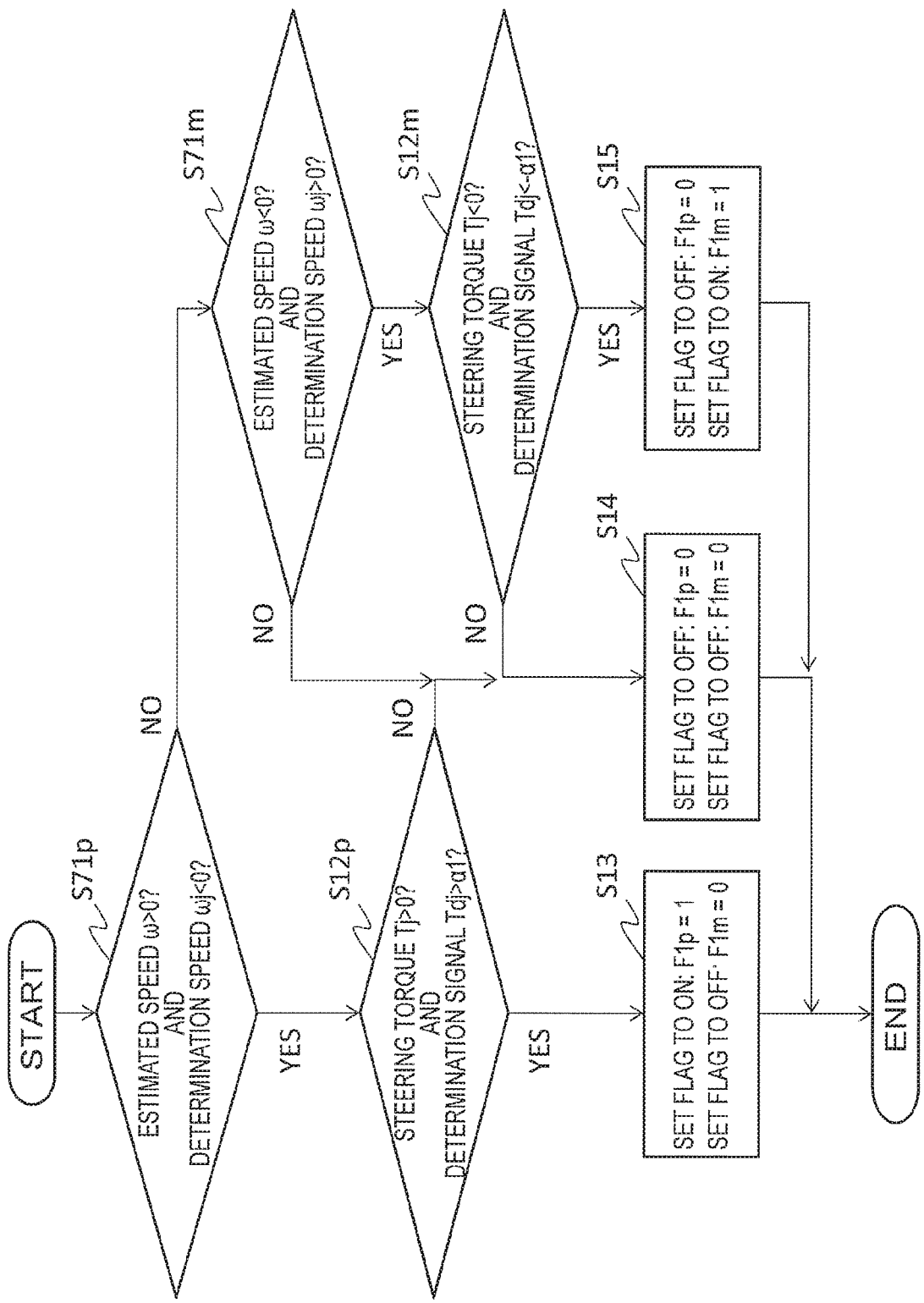

ELECTRIC POWER STEERING APPARATUS AND METHOD FOR CONTROLLING ELECTRIC POWER STEERING

CROSS REFERENCE TO RELATED APPLICATIONS

This application is a National Stage of International Application No. PCT/JP2017/018708 filed May 18, 2017.

TECHNICAL FIELD

The present invention relates to an electric power steering apparatus capable of estimating a rotation angle of a motor without using a rotation angle sensor, and a method of controlling an electric power steering.

BACKGROUND ART

As disclosed in Patent Literature 1 and Patent Literature 2, some related-art electric power steering apparatus are configured to estimate a rotation angle of a motor, to thereby execute sensorless control that uses an estimated angle signal (hereinafter referred to as "estimated angle") in place of a rotation angle detected by a sensor. Moreover, there are not only electric power steering apparatus but also many control apparatus configured to drive a motor through the sensorless control that uses the estimated angle as disclosed in Patent Literature 3.

In the sensorless control that uses the estimated angle, when a difference (hereinafter also referred to as "estimation error") occurs between the rotation angle of the motor and the estimated angle, the motor cannot generate a desired torque. Thus, a motor torque fluctuates, and a vibration occurs. Therefore, the electric power steering apparatus configured to execute the sensorless control that uses the estimated angle has such a problem that a driver has difficulty in steering due to the torque fluctuation caused by the estimation error. Causes for the occurrence of the estimation error vary depending on estimation methods, such as errors (hereinafter referred to as "parameter errors") in a resistance value and an inductance of the motor, which are set as parameters in calculation equations for the estimated angle, and an estimation delay.

To address such a problem, in Patent Literature 1, when there is a negative correlation between a control angle, which is the estimated angle, and the motor torque, the control angle, namely, the estimated angle, is corrected by decreasing a limit value on an added angle corresponding to a change amount of the estimated angle, namely, an estimated speed. For example, when the sign of the added angle, namely, the estimated speed, and the sign of the derivative of the steering torque are the same signs, it is determined that the control angle and the motor torque have the negative correlation, and the control angle, namely, the estimated angle, is thus corrected.

CITATION LIST

Patent Literature

[PTL 1] JP 2010-213550 A
[PTL 2] JP 5837230 B2
[PTL 3] JP 4672236 B2

SUMMARY OF INVENTION

Technical Problem

In the following, a description is given while the sign of the steering torque and the sign of the rotation speed of the motor corresponding to steering toward the right direction are set to positive. The correction method in Patent Literature 1 corrects the added angle, namely, the estimated speed, to thereby be able to reduce the estimation error of the estimated angle when the sign of the added angle, namely, the estimated speed, and the sign of the derivative of the steering torque are the same signs. However, even when the driver executes usual additional steering, the steering torque increases, and the rotation angle of the motor also increases. On this occasion, when the steering torque increases, the derivative of the steering torque is positive. When the rotation angle of the motor increases, the rotation speed and the estimated speed of the motor are positive. Therefore, in this correction method, the condition for the correction is satisfied even in the usual steering. That is, there is such a problem that the error increases as a result of the restriction erroneously imposed when the correction is not actually required. This problem is caused by such a fact that a frequency component of the steering of the driver contained in the detected steering torque and a frequency component caused by the torque and the rotation angle of the motor cannot be distinguished from each other.

In the electric power steering apparatus, the steering torque of the driver is detected based on an amount of torsion between an angle on a steering wheel side, which is a top side of a torsion bar, and an angle on a motor side, which is a bottom side of the torsion bar. Thus, the detected steering torque contains not only the frequency component of the steering angle, namely, the frequency component of the steering of the driver, but also the frequency component of the rotation angle of the motor, namely, the frequency component of the torque of the motor. Therefore, it is required to accurately obtain a decrease in the torque of the motor, which is the frequency component higher than the frequency component of the steering of the driver, by removing the frequency component of the steering of the driver contained in the detected steering torque.

The present invention has been made in view of the above-mentioned problem, and therefore has an object to provide an electric power steering apparatus configured to accurately correct an estimated speed to suppress a torque fluctuation caused by an estimation error in an estimated angle, to thereby be able to achieve stable sensorless control having a small vibration, and a method of controlling the electric power steering apparatus.

Solution to Problem

According to one embodiment of the present invention, there is provided, for example, an electric power steering apparatus including: a steering torque detection unit configured to detect a steering torque of a driver; a motor configured to assist a steering force of the driver; an estimated speed calculation unit configured to calculate an estimated speed, which is an estimated value of a rotation speed of the motor; an estimated speed correction unit configured to correct the estimated speed based on the steering torque; an estimated angle calculation unit configured to calculate an estimated angle of the motor by integrating the estimated speed after the correction; and an electric power supply unit configured to supply electric power to the motor based on the estimated angle, wherein the estimated speed correction unit is configured to correct the estimated speed when a determination signal, which is based on a value obtained by removing a frequency component of steering of the driver from a derivative of the steering torque, the steering torque, and the estimated speed have the same signs.

Advantageous Effects of Invention

According to the present invention, it is possible to provide the electric power steering apparatus configured to accurately correct the estimated speed to suppress the torque fluctuation caused by the estimation error in the estimated angle, to thereby be able to achieve stable sensorless control having a small vibration, and a method of controlling the electric power steering apparatus.

BRIEF DESCRIPTION OF DRAWINGS

FIG. 6 is a flowchart for illustrating an example of processing of determining whether or not an estimated speed, a steering torque, and a determination signal have the same signs in processing by a correction determination unit in the first embodiment of the present invention.

FIG. 15 is a flowchart for illustrating an example of processing of determining whether or not the estimated speed, the steering torque, and the determination signal have the same signs in processing by the correction determination unit in the third embodiment of the present invention.

DESCRIPTION OF EMBODIMENTS

Figure 1:
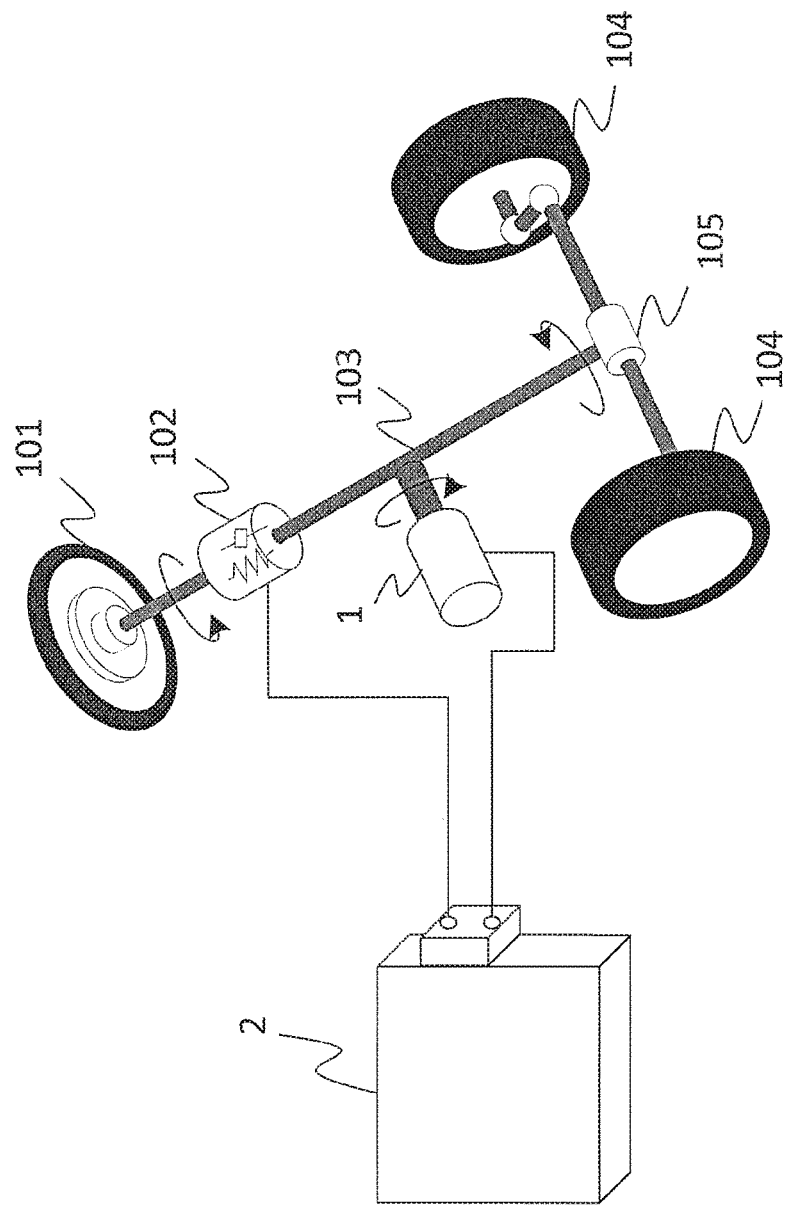
FIG. 1 is a schematic configuration diagram for illustrating an electric power steering apparatus according to an embodiment of the present invention.

According to the present invention, it can be determined that estimation errors currently occur in an estimated speed and an estimated angle when a determination signal, which is based on a value obtained by removing a frequency component of steering by a driver from a derivative of a steering torque, the steering torque, and an estimated speed have the same signs.

First, a direction of steering by a driver and an increase and a decrease in the steering torque can be recognized from the sign of the steering torque and the sign of the derivative of the steering torque. Thus, when the sign of the steering torque and the sign of the derivative of the steering torque are the same signs, it can be determined that a magnitude of the steering torque is increasing. For example, when both of the sign of the steering torque and the sign of the derivative of the steering torque are positive, it can be determined that the magnitude of the steering torque is increasing during a rightward steering.

Further, when the sign of the determination signal obtained by removing the frequency component of the steering of the driver from the derivative of the steering torque and the sign of the estimated speed are the same signs, it can be determined that the torque of the motor is reduced by an increase in an error in the estimated angle due to the error in the estimated speed, and the steering torque is consequently increased. This determination is based on such a fact that the derivative of the steering torque and the rotation speed of the motor correlate with each other, and positive and negative signs thereof are opposite to each other in a frequency band higher than the frequency of the steering of the driver. That is, when the signs are the same signs, it can be determined that the estimated speed contains an error. In addition, through use of the value obtained by removing the frequency component of the steering of the driver from the derivative of the steering torque as the determination signal, a change in the torque of the motor contained in the detected steering torque can be extracted, and hence it can be distinguished for the determination whether the increase in the detected steering torque is caused by an increase in a force of the driver or a decrease in the torque of the motor.

The increase in the error in the estimated angle can be determined by the above-mentioned determination, and hence the error in the estimated angle can be reduced by correcting the estimated speed. The error in the estimated angle can be reduced, and hence a torque fluctuation caused by the error in the estimated angle can be suppressed. Therefore, an electric power steering apparatus capable of achieving stable sensorless control with a small vibration and a method of controlling the electric power steering apparatus can be provided.

Now, an electric power steering apparatus and a method of controlling the electric power steering according to each of embodiments of the present invention are described with reference to the drawings. In each of the embodiments, the same or corresponding portions are denoted by the same reference symbols, and the overlapping description thereof is omitted.

First Embodiment

A schematic configuration diagram for illustrating an example of an electric power steering apparatus according to an embodiment of the present invention is illustrated in FIG. 1. In FIG. 1, the electric power steering apparatus includes a steering wheel 101, a steering shaft 103, a rack-and-pinion gear 105, wheels 104, a motor 1, an electronic control unit (ECU) 2, and a torque sensor 102. The motor 1 is configured to assist a steering force of the driver. The ECU 2 is configured to supply electric power for driving the motor. The torque sensor 102 is configured to detect a steering torque of the driver.

In FIG. 1, the steering torque applied from the driver (not shown) to the steering wheel 101 passes through a torsion bar of the torque sensor 102 and the steering shaft 103 to be transmitted to a rack via the rack-and-pinion gear 105, to thereby steer the wheels 104.

Figure 2:
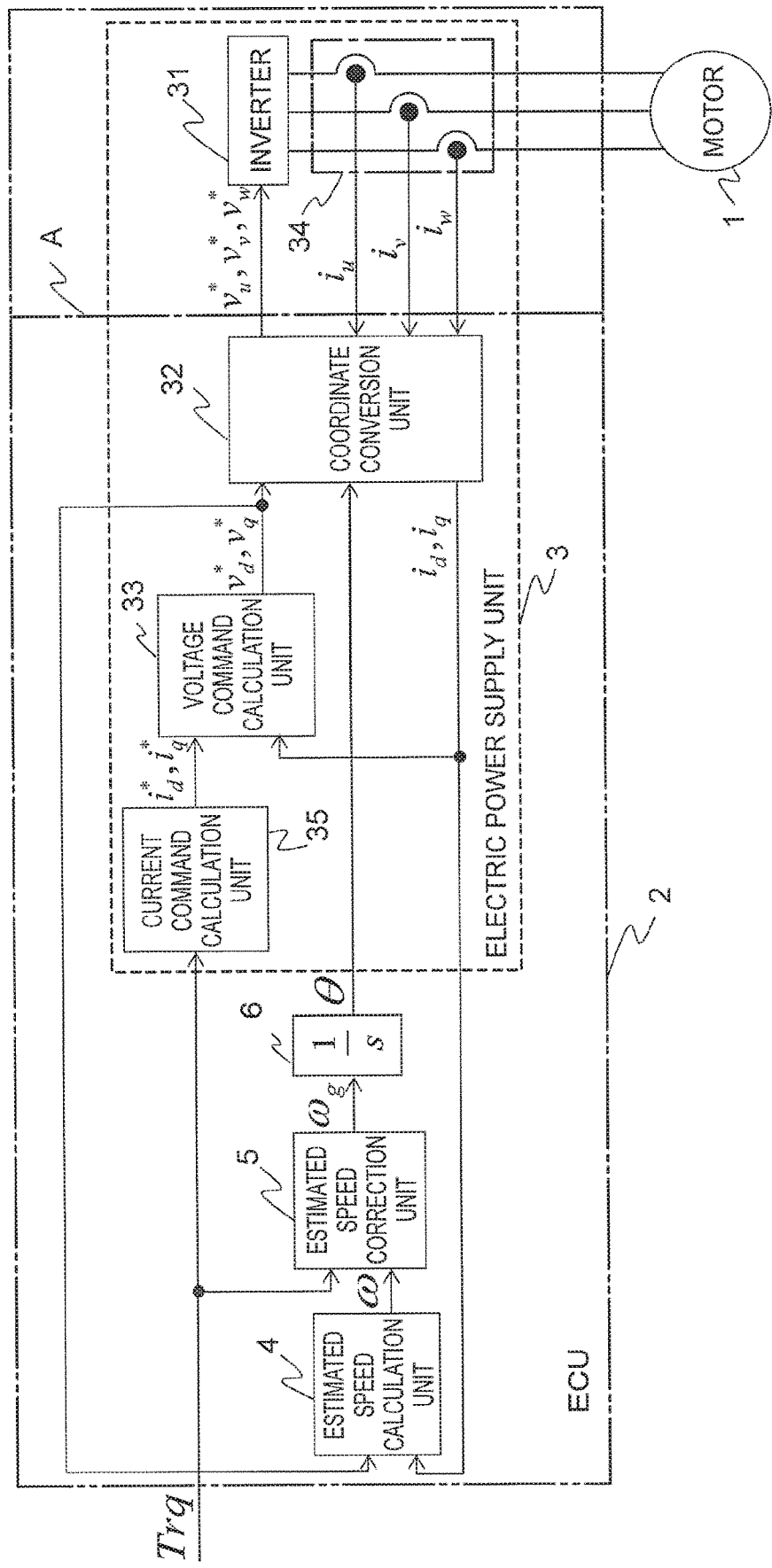
FIG. 2 is a functional block diagram for illustrating an ECU of the electric power steering apparatus according to the embodiment of the present invention.

FIG. 2 is a functional block diagram for illustrating the ECU of FIG. 1. The motor 1 generates a motor torque Tm as output through electric power supplied from an electric power supply unit 3 included in the ECU 2. The motor torque Tm is transmitted to the steering shaft 103, to thereby reduce the steering torque applied by the driver during the steering. As the motor 1, it is only required to use a generally well-known motor, such as a permanent magnet synchronous motor or an induction motor. In the first embodiment, the motor 1 is a three-phase AC permanent-magnet synchronous motor.

The electric power supply unit 3 includes an inverter 31, a coordinate conversion unit 32, a voltage command calculation unit 33, a current detector 34, and a current command calculation unit 35, and supplies the electric power to the motor 1 based on an estimated angle θ.

The current detector 34 and the inverter 31 may be provided on the motor 1 side. In that case, the ECU 2 includes a configuration on a left side of a long dashed short dashed line A of FIG. 2.

The current command calculation unit 35 calculates a d-axis current command id* and a q-axis current command iq*. The d-axis current command id* and the q-axis current command iq* are command values relating to the motor torque Tm, which is the output of the motor 1. A method of calculating the d-axis current command id* and the q-axis current command iq* is not particularly limited. However, in this case, the d-axis current command id* is set to 0, and the q-axis current command iq* is determined in accordance with a steering torque Trq. The d-axis current command id* may be determined in accordance with a rotation speed of the motor 1. A value corresponding to the rotation speed of the motor 1 may be determined based on, for example, an estimated speed ωg described later.

The voltage command calculation unit 33 generates a d-axis voltage command vd* and a q-axis voltage command vq* so that the d-axis current command id* and the q-axis current command iq* and a d-axis detected current id and a q-axis detected current iq match each other in respective axis components. A configuration of feeding back the detected currents is employed in this case, but the voltage commands may be calculated by feedforward without using the detected currents.

The current detector 34 detects a u-phase detected current iu, a v-phase detected current iv, and a w-phase detected current iw as currents flowing in respective phases of the motor 1. The three phase currents are detected in this case, but the currents in a part of the phases may not be detected, and may be estimated from the currents in the other detected phases.

The coordinate conversion unit 32 applies coordinate conversion to the d-axis voltage command vd* and the q-axis voltage command vq* based on the estimated angle θ, to thereby generate a u-phase voltage command vu*, a v-phase voltage command vv*, and a w-phase voltage command vw*. Further, the coordinate conversion unit 32 applies coordinate conversion to the u-phase detected current iu, the v-phase detected current iv, and the w-phase detected current iw based on the estimated angle θ, to thereby generate the d-axis detected current id and the q-axis detected current iq.

The inverter 31 applies, as electric power, a three-phase AC voltage based on the u-phase voltage command vu*, the v-phase voltage command vv*, and the w-phase voltage command vw* to the motor 1, to thereby generate the motor torque Tm.

The estimated speed calculation unit 4 estimates a rotation speed ωe of the motor, and outputs the estimated value as an estimated speed ω. A method of calculating the estimated speed ω is not particularly limited, but, as an example, a description is given of a configuration of using an induced voltage for the estimation as disclosed in Patent Literature 3. This estimation method uses such a fact that the induced voltage is proportional to a rotation speed of the motor, namely, a derivative of the rotation angle.

vd*: The d-axis voltage command, vq*: the q-axis voltage command, id: the d-axis detected current, and iq: the q-axis detected current are set as inputs, and an observer is formed as given by Expression (1) to Expression (5) to calculate the estimated speed ω.

$$\omega = wr0 - \frac{e04}{pdr0} \tag{1}$$

$$wr0 = \left(kp + \frac{ki}{s}\right)(eq \cdot pdr0) \tag{2}$$

$$\frac{d}{dt}\begin{pmatrix} id0 \\ iq0 \\ pdr0 \end{pmatrix} = \qquad (3)$$

$$\begin{pmatrix} -\frac{R}{Ld} & \frac{Lq}{Ld}\omega & 0 \\ -\frac{Ld}{Lq}\omega & -\frac{R}{Lq} & -\frac{wr0}{Lq} \\ 0 & 0 & 0 \end{pmatrix} \begin{pmatrix} id0 \\ iq0 \\ pdr0 \end{pmatrix} + \begin{pmatrix} \frac{1}{Ld} & 0 \\ 0 & \frac{1}{Lq} \\ 0 & 0 \end{pmatrix} \begin{pmatrix} vd^* \\ vq^* \end{pmatrix} - \begin{pmatrix} e01 \\ e02 \\ e03 \end{pmatrix}$$

$$\begin{pmatrix} e01 \\ e02 \\ e03 \\ e04 \end{pmatrix} = \begin{pmatrix} g11 & g12 \\ g21 & g22 \\ g31 & g32 \\ g41 & g42 \end{pmatrix} \begin{pmatrix} ed \\ eq \end{pmatrix} \qquad (4)$$

$$\begin{pmatrix} ed \\ eq \end{pmatrix} = \begin{pmatrix} id0 - id \\ iq0 - iq \end{pmatrix} \qquad (5)$$

In the expression, ω and ωr0 represent estimated speeds, id0 represents a d-axis estimated current, iq0 represents a q-axis estimated current, pdr0 represents an estimated magnetic flux, ed represents a d-axis deviation, eq represents a q-axis deviation, R represents a resistance value of the motor, Ld represents a d-axis inductance of the motor, and Lq represents a q-axis inductance of the motor. Moreover, s represents a differential operator of Laplace transform, kp, ki, g11, g12, g21, g22, g31, g32, g41, and g42 represent feedback gains for calculating estimated angle θ, and e01, e02, e03, and e04 represent intermediate variables of calculation. In this estimation method, the resistance value R and the inductances Ld and Lq of the motor are set as the parameters, and estimation errors Δω and Δθ are thus caused by parameter errors in the estimated speed ω and the estimated angle θ.

Figure 3:
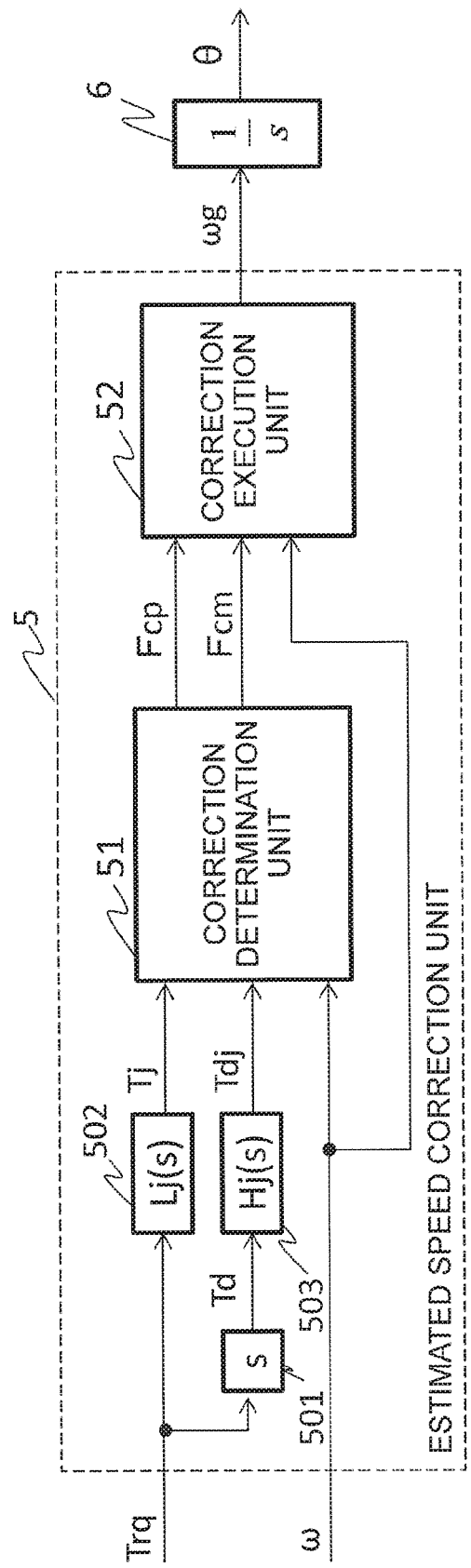
FIG. 3 is a functional block diagram for illustrating an example of configurations of an estimated speed correction unit and an estimated angle calculation unit in a first embodiment of the present invention.

FIG. 3 is a functional block diagram for illustrating an example of configurations of an estimated speed correction unit 5 and an estimated angle calculation unit 6 configured to calculate the estimated angle θ of the motor. The estimated speed correction unit 5 corrects the estimated speed ω calculated by the estimated speed calculation unit 4 based on the steering torque Trq. Then, the estimated angle calculation unit 6 integrates the estimated speed ωg after the correction, to thereby calculate the estimated angle θ.

The estimated speed correction unit 5 includes a correction determination unit 51 and a correction execution unit 52. The correction determination unit 51 determines whether or not a determination signal Tdj, which is based on a value obtained by removing the frequency component of the steering of the driver from a derivative Td of the steering torque Trq, the steering torque Trq, and the estimated speed ω have the same signs. The correction execution unit 52 corrects the estimated speed ω based on the estimated speed ω and correction flags Fcp and Fcm, which are outputs of the correction determination unit 51.

Figure 4A:
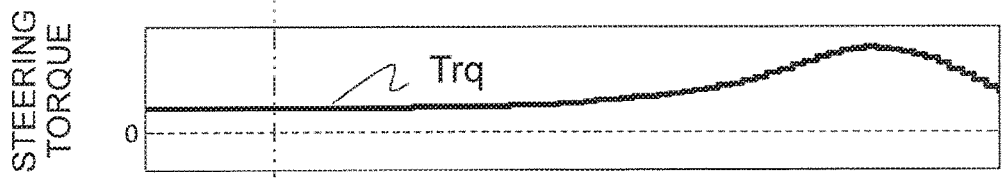
FIG. 4A to FIG. 4F are graphs for showing changes in respective factors exhibited when a torque fluctuation caused by an error in an estimated speed occurs.
Figure 4B:
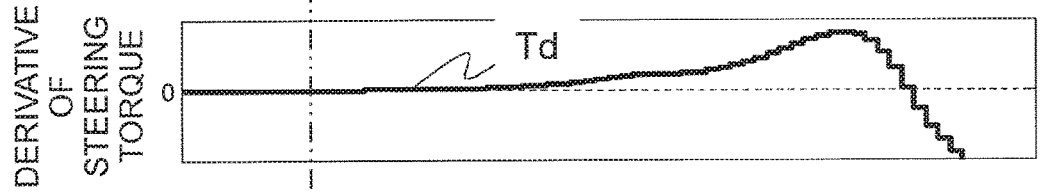
Figure 4C:
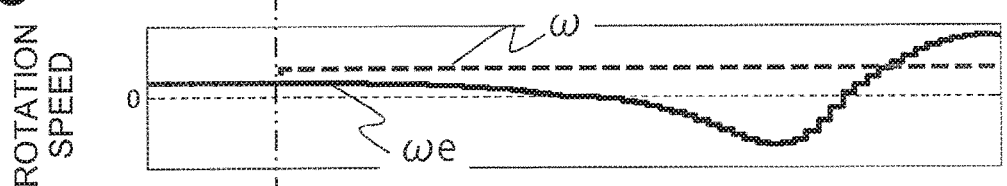
Figure 4D:
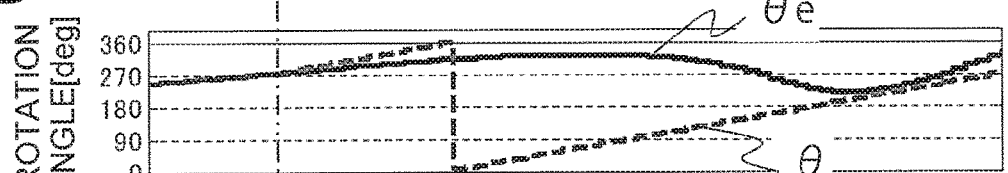
Figure 4E:
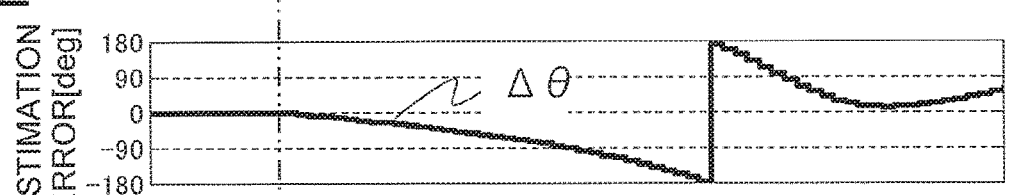
Figure 4F:
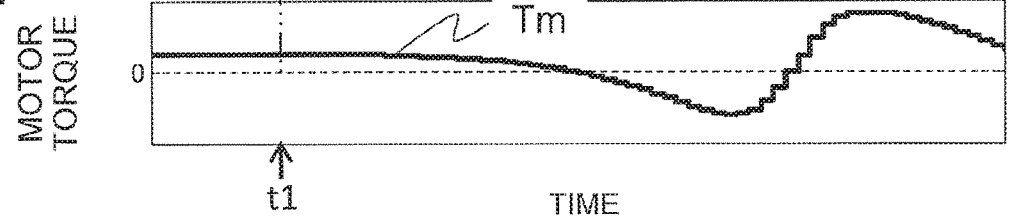

Before a detailed description of the estimated speed correction unit 5, a description is now given of the torque fluctuation due to the errors in the estimated speed and the estimated angle, which is a problem to be solved by the present invention. FIGS. 4A to 4F are graphs for showing changes in respective factors exhibited when the torque fluctuation caused by the error in the estimated speed occurs. From the top of FIGS. 4A to 4F:
the detected steering torque Trq is shown in FIG. 4A,
the derivative Td of the steering torque is shown in FIG. 4B,
the rotation speed ωe of the motor is shown in FIG. 4C,
the rotation angle θe of the motor is shown in FIG. 4O,
the estimation error Δθ of the rotation angle is shown in FIG. 4D, and
the motor torque Tm is shown in FIG. 4E.

Moreover, in FIG. 4C and FIG. 4D, actual values of the rotation speed ωe of the motor and the rotation angle θe of the motor are plotted as the solid lines, and the estimated speed ω and the estimated angle θ are plotted as the broken lines. In FIG. 4E, as the estimation error Δθ, a difference Δθ=θe−θ between the actual rotation angle θe and the estimated angle θ is plotted. In this case, such an error that the estimated speed ω becomes higher than the actual rotation speed ωe is reproduced for easy understanding by fixing the estimated speed ω to a constant value at a time point t1. For example, when calculation abnormality occurs in the estimated speed ω, the estimated speed ω may be fixed to a constant value in such a manner.

The estimated speed ω becomes higher than the rotation speed ωe at the time point t1. As a result, the estimated angle θ gradually deviates from the actual rotation angle θe, and the magnitude of the estimation error Δθ thus increases. As the magnitude of the estimation error Δθ increases, the motor torque Tm decreases. When the magnitude of estimation error Δθ exceeds 90 degrees, the direction of the motor torque Tm becomes an opposite direction with respect to a desired assist direction. As the motor torque Tm decreases, the steering torque Trq increases, and the derivative Td of the steering torque Trq increases toward a positive direction. The value of the estimation error Δθ falls within a range of from −180 degrees to 180 degrees. Thus, when the estimation error Δθ increases toward a negative direction to exceed −180 degrees, the estimation error Δθ returns to 180 degrees, and is switched to a direction toward which the estimation error Δθ gradually decreases. As the estimation error Δθ decreases, the direction of the motor torque Tm is directed to the desired assist direction, and the assist amount increases. As the assist amount increases, the steering torque Trq also decreases. A vibration consequently occurs as the motor torque Tm repeats the fluctuation in the torque in such a manner, and the driver has thus difficulty in driving. Although the case in which the estimated speed ω is fixed to a constant value is described, the torque fluctuation is caused not only when such an error that the estimated speed ω is fixed to a constant value occurs. A similar torque fluctuation occurs in the motor torque Tm when, for example, an error occurs in the estimated speed ω due to an error in a parameter used for the calculation.

A description is now given of input signals to the correction determination unit 51 included in the estimated speed correction unit 5. The correction determination unit 51 first determines whether or not a steering torque Tj used for the determination and the determination signal Tdj calculated from the derivative of the steering torque have the same signs, to thereby determine whether or not the steering torque is increasing.

When only whether or not the steering torque Trq increases is determined, the detected steering torque Trq and the derivative Td of the steering torque may directly be used so as to determine the signs. However, in the first embodiment, filtering is applied to each of the steering torque Trq and the derivative Td of the steering torque in order to more accurately determine the necessity for the correction. In particular, when only the derivative Td of the steering torque is directly used, there is the above-mentioned problem in that it cannot be determined whether the increase in the steering torque Trq is caused by the steering of the driver or the decrease in the torque Tm of the motor 1. Therefore, the removal of the frequency component of the steering of the driver through the application of the filtering to the derivative Td of the steering torque has a significant meaning, which is not found in the related art.

As a determination steering torque Tj, which is a steering torque used for the determination, the detected steering torque Trq may directly be used, but a value calculated as given by Expression (6), which is obtained by applying low-pass filtering to the detected steering torque Trq through use of a first filter (Lj(s)) 502, is used in this case. Such an additional effect that whether the direction is positive or negative on average can be determined is obtained by removing a frequency component higher than a frequency of the usual steering of the driver even when the steering torque Trq presents an oscillating response due to the change in the torque Tm of the motor. Although a similar effect can be provided not by the low-pass filtering but by an averaging through use of a moving average filter, the low-pass filter has such an advantage that filter design is easier for a frequency component of interest.

$$T_j = L_j(s) \cdot \text{Trq} \tag{6}$$

The low-pass filter Lj(s) is a first-order low-pass filter given by Expression (7). In general, a frequency at which the driver can steer is equal to or lower than about 3 Hz. Moreover, for example, the steering frequency during a lane change is approximately 0.2 Hz, and it is often the case that the steering is performed at such a low frequency. Thus, a cutoff frequency ωlj of the low-pass filter Lj(s) is set to 3 Hz to extract the frequency component higher than the frequency of the usual steering of the driver.

$$L_j(s) = \frac{\omega_{lj}}{s + \omega_{lj}} \tag{7}$$

In the expressions, s represents the differential operator of the Laplace transform.

The determination signal Tdj is set through use of a relationship between the steering torque Trq and the rotation angle θe of the motor. The torque sensor 102 detects the steering torque Trq based on an amount of a torsion between an angle on the steering wheel side, which is a top side of the torsion bar, and an angle on the motor side, which is a bottom side of the torsion bar.

When a rigidity of the torsion bar is represented by Ks, a relationship between the steering torque Trq and the rotation angle θe of the motor is given by Expression (8) through use of the following terms.

θh: Steering angle
Pm: Number of pole pairs of the motor 1
Gn: Gear ratio between the motor 1 and the steering shaft 103

$$Trq = k_s \left( \theta_h - \frac{1}{G_n \cdot P_m} \theta_e \right) \tag{8}$$

In this case, the steering angle θh depends on the frequency of the steering of the driver. Therefore, the steering torque can be approximated by focusing on a frequency band higher than a main resonant frequency of the electric power steering apparatus as given by Expression (9). A conversion gain k indicating a ratio between the steering torque Trq and the rotation angle θe of the motor is given by Expression (10). In general, the vibration occurs at a frequency equal to or higher than the resonant frequency, and the vibration component can thus accurately be extracted in accordance with this conversion gain. An error occurs between the steering frequency and the resonant frequency, but a vibration does not usually occur, and hence there is no problem. As required, a more accurate relationship can be obtained through use of an inverse model from the angle to the torque.

$$Trq \cong -k_s \cdot \frac{1}{G_n \cdot P_m} \theta_e = -\frac{1}{k} \cdot \theta_e \tag{9}$$

$$k = \frac{G_n \cdot P_m}{k_s} \tag{10}$$

Expression (11) is given by further differentiating Expression (9).

$$s \cdot Trq = -\frac{1}{k} \cdot s \cdot \theta_e = -\frac{1}{k} \cdot \omega_e \tag{11}$$

$$\Leftrightarrow \omega_e = -k \cdot s \cdot Trq$$

Based on Expression (11), it is found that the derivative Td of the steering torque and the rotation speed ωe of the motor 1 correlate with each other, and the sign of the derivative Td of the steering torque and the sign of the rotation speed ωe of the motor are opposite to each other. The determination signal Tdj is set through use of this relationship.

As described above, the approximation given by Equation (11) focuses on the frequency higher than the frequency of the steering of the driver. Therefore, the determination signal Tdj is calculated by derivative calculation unit (s) 501 differentiating the detected steering torque Trq, and by a second filter Hj(s) 503 extracting the frequency component higher than the frequency of the steering of the driver as given by Expression (12).

$$T_{dj} = H_j(s) \cdot s \cdot \text{Trq} \tag{12}$$

In the expression, s represents the differential operator of the Laplace transform.

Figure 5A:
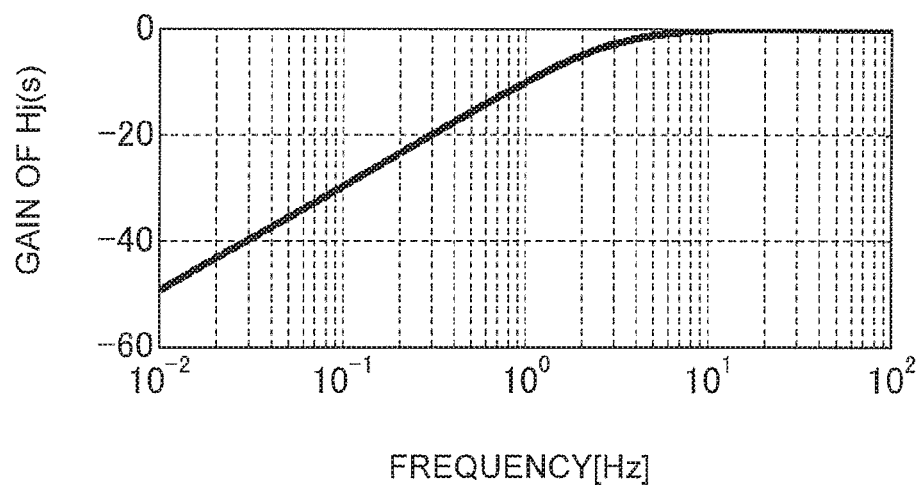
FIG. 5A and FIG. 5B are graphs for showing an example of gain characteristics of a filter Lj(s) and a filter Hj(s) in the first embodiment of the present invention.
Figure 5B:
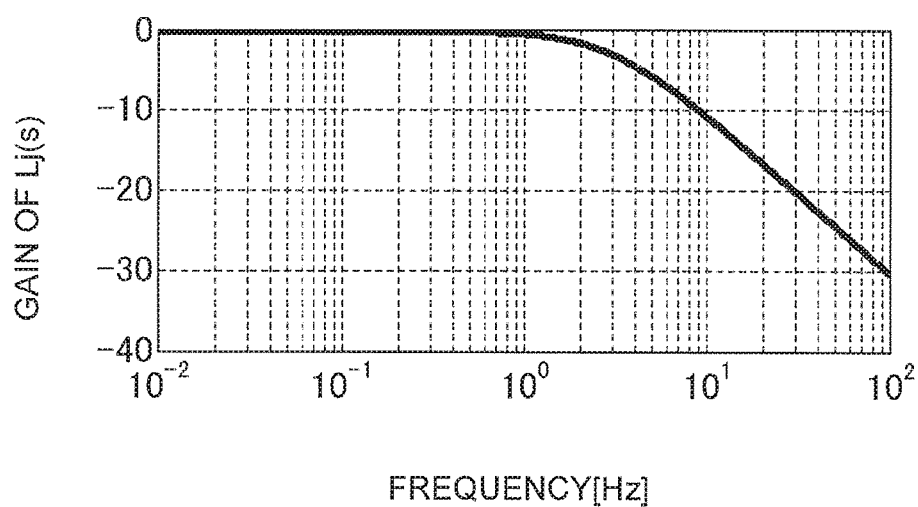

In this case, the filter Hj(s) is a first-order high-pass filter given by Expression (13). A cutoff frequency ωhj of the high-pass filter Hj(s) is set to 3 Hz in order to extract the frequency component higher than the frequency of the usual steering of the driver. FIG. 5A is a bode diagram for showing an example of the gain characteristic of the filter Hj(s). FIG. 5B is a bode diagram for showing an example of the gain characteristic of the filter Lj(s).

$$H_j(s) = \frac{s}{s + \omega_{hj}} \tag{13}$$

With the configuration described above, when the steering torque and the derivative of the steering torque have the same signs, that is, the determination steering torque Tj and the determination signal Tdj have the same signs, it can be determined that the magnitude of the steering torque is increasing. Further, necessity of the correction to the estimated speed ω is determined through use of such a fact that the derivative Td of the steering torque and the rotation speed ωe of the motor in general have the signs opposite to each other based on the relationship given by Expression (11). Specifically, when the determination signal Tdj corresponding to the derivative Td of the steering torque and the estimated speed ω corresponding to the rotation speed ωe of the motor have the same signs, it can be determined that the torque Tm of the motor is decreasing as a result of the increase in the error Δθ in the estimated angle θ due to the error in the estimated speed ω, and the magnitude of the steering torque Trq is increasing. The determination signal Tdj has the value corresponding to the actual rotation speed ωe through use of the relationship given by Expression (11), and the necessity for the correction can thus accurately be determined. Further, it can be distinguished for the determination whether the increase in the steering torque Trq is caused by the increase in the force of the driver or the decrease in the torque Tm of the motor by setting the determination signal Tdj to the value obtained by removing the frequency component of the steering of the driver from the derivative Td of the steering torque.

A description is now given of processing by the correction determination unit 51.

FIG. 6 is a flowchart for illustrating the processing by the correction determination unit 51, and illustrating an example of the processing of determining whether or not the estimated speed ω, the steering torque Tj for the determination, and the determination signal Tdj have the same signs. When the estimated speed ω is a positive value (that is, "YES" in Step S11p), the steering torque Tj is a positive value, and the determination signal Tdj is a positive value, the three signals have the same signs, and the determination condition is thus satisfied. In this state, it is only required to determine whether or not the determination signal Tdj is a positive value. However, in the first embodiment, it is determined whether or not the determination signal Tdj is larger than a positive threshold value α1 in order to more accurately determine a change in the motor torque Tm. As a result, it can be determined that the determination signal Tdj has greatly changed, that is, the motor torque Tm has greatly changed, and it can thus be found that the correction is required.

When the steering torque Tj is a positive value, and the determination signal Tdj is larger than the positive threshold value α1 (that is, "YES" in Step S12p), a first positive-side flag F1p is set to ON (F1p=1), and a first negative-side flag F1m is set to OFF (F1m=0) (Step S13).

Meanwhile, when the estimated speed ω is a negative value (that is, "NO" in Step S11p, and "YES" in Step S11m), it is determined that the steering torque Tj is a negative value, and the determination signal Tdj is a negative value. In this case, it is determined whether or not the determination signal Tdj is smaller than a negative threshold value −α1, to thereby determine whether or not the motor torque Tm has greatly changed. When the steering torque Tj is a negative value, and the determination signal Tdj is smaller than the negative threshold value −α1, the first negative-side flag F1m is set to ON (F1m=1), and the first positive-side flag F1p is set to OFF (F1p=0) (Step S15).

Otherwise ("NO" in any one of Step S11m, Step S12p, and Step S12m), the first flags F1p and F1m are set to OFF (F1p=0 and F1m=0) (Step S14).

Figure 7:
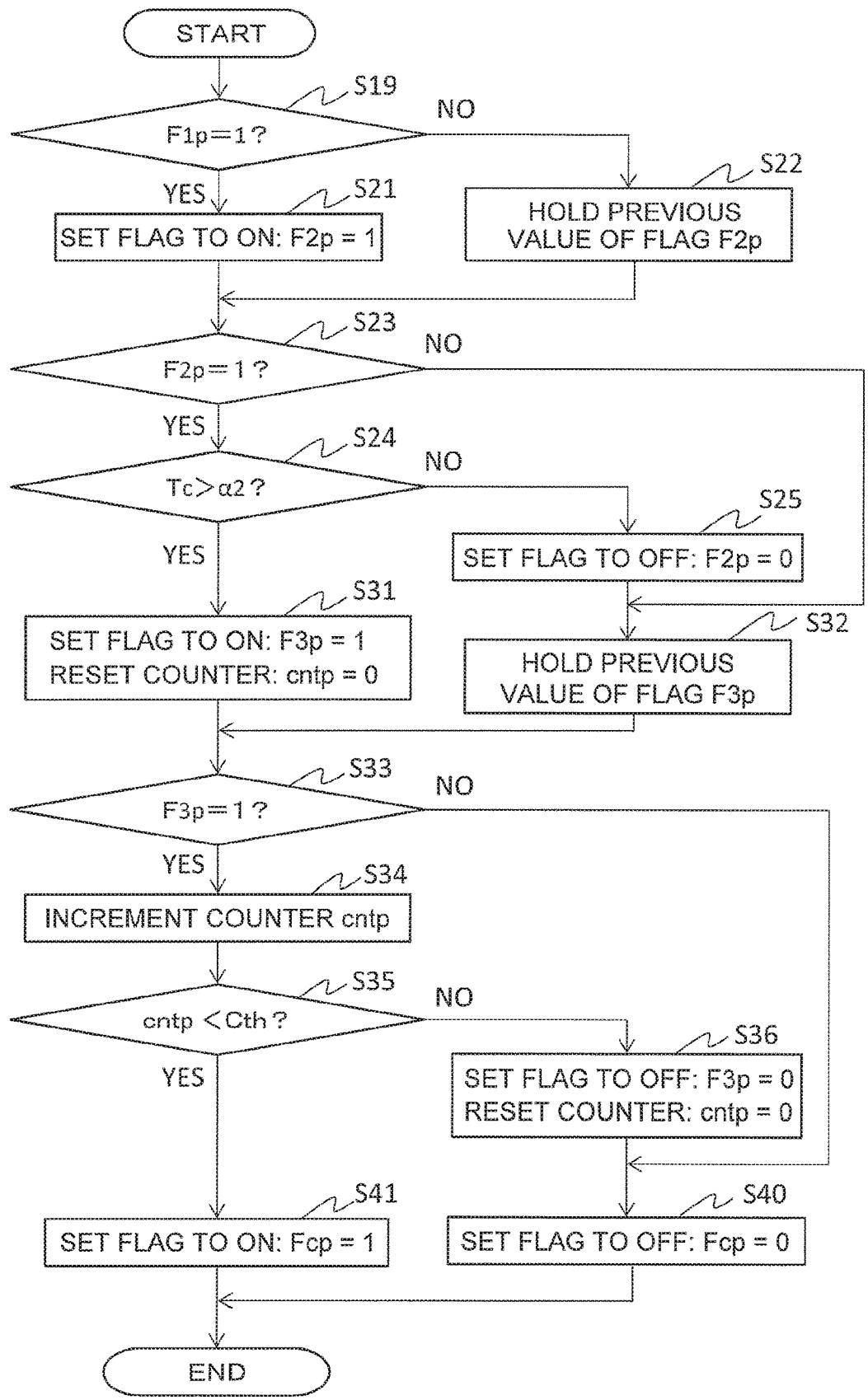
FIG. 7 is a flowchart for illustrating an example of processing of determination based on a correction release condition and determination based on a time elapse in the processing by the correction determination unit in the first embodiment of the present invention.

FIG. 7 is a flowchart for illustrating the processing by the correction determination unit 51, and illustrating an example of processing of determination based on a correction release condition and determination based on a time elapse. In this processing, the flag that has once been set to ON in Processing Step S13 or Processing Step S15 of FIG. 6 is held.

A description is now given of a case in which the first positive-side flag F1p is set to ON in Processing Step S13.

First, it is determined whether or not the first positive-side flag F1p is ON (F1p=1) (Step S19). When the first positive-side flag F1p is ON (that is, "YES" in Step S19), a second positive-side flag F2p is set to ON (F2p=1) (Step S21). Meanwhile, when the first positive-side flag F1p is OFF (that is, "NO" in Step S19), the second positive-side flag F2p holds a previous value (Step S22). An initial state of the second positive-side flag F2p is OFF (F2p=0).

Then, it is determined whether or not the second positive-side flag F2p is ON (F2p=1) (Step S23). When the second positive-side flag F2p is ON (that is, "YES" in Step S23), it is further determined whether or not a hold determination signal Tc is larger than a positive threshold value α2 (Step S24).

A description is now given of the hold determination signal Tc. A decrease in the derivative Td of the steering torque Trq indicates that the decrease in the motor torque Tm has disappeared, that is, the estimation error Δθ of the estimated angle θ has decreased. Therefore, it is only required to determine whether or not the steering torque derivative Td decreases in order to continue the correction until the estimation error Δθ of the estimated angle θ decreases. Thus, the correction release condition based on the steering torque derivative Td is set, and the correction is continued until the correction release condition is satisfied. As the correction release condition, a condition that the hold determination signal Tc is larger than the threshold value α2 is set. That is, while the hold determination signal Tc is equal to or smaller than the threshold value α2, the correction is continued.

The hold determination signal Tc is only required to be a value based on the derivative Td of the steering torque. In this case, information on the change in the motor torque Tm contained in the derivative Td of the steering torque can further accurately be determined by using, as the hold determination signal Tc, the determination signal Tdj obtained by removing the frequency component of the steering of the driver from the derivative Td of the steering torque.

When the threshold value α2 is set as α2<α1, it is possible to determine whether or not the decrease in the torque Tm of the motor due to the error in the estimated angle θ can be suppressed to be lower than that at a start of the correction, and the correction to the estimated speed ω can be continued until the effect of the correction appears. Moreover, even when α2 is set as α2=α1, there can be provided such an effect that the estimated speed ω can be continued until the correction release condition is satisfied. For example, even when the steering torque Tj for the determination temporarily takes a negative value due to vibration, and the first positive-side flag F1p is thus set to OFF, the second positive-side flag Ftp can be held until the correction release condition is satisfied, and the correction to the estimated speed ω can consequently be continued.

When the hold determination signal Tc is larger than the threshold value α2 (that is, "YES" in Step S24), a third positive-side flag is set to ON (F3p=1), and a counter cntp is reset to 0 (Step S31). Then, the processing proceeds to Processing Step S33. When the hold determination signal Tc is equal to or smaller than the threshold value α2 (that is, "NO" in Step S24), the second positive-side flag is set to OFF (F2p=0) (Step S25), and the third positive-side flag F3p holds a previous value (Step S32). Then, the processing proceeds to Processing Step S33.

Meanwhile, when the second positive-side flag is OFF (F2p=0) (that is, "NO" in Step S23), the third positive-side flag F3p holds a previous value (Step S32). Then, the processing proceeds to Processing Step S33.

An initial state of the third positive-side flag F3p is OFF (F3p=0), and the initial value of the counter cntp is 0.

As described above, the correction to the estimated speed ω is continued until the correction release condition is satisfied, that is, while the hold determination signal Tc is larger than the threshold value α2, by setting the correction release condition through use of the hold determination signal Tc based on the derivative Td of the steering torque. An increase and a decrease in the error Δθ in the estimated angle θ appear in the steering torque Trq, and hence it is possible to determine whether or not the effect of the correction appears based on the derivative Td of the steering torque. Thus, the correction can be continued until the effect of the correction appears.

In Processing Step S33, the correction determination unit 51 determines whether or not the third positive-side flag is ON. When the third positive-side flag is ON (that is, "YES" in Step S33), the counter cntp is incremented (Step S34), and the processing proceeds to Processing Step S35. Meanwhile, when the third positive-side flag is OFF (that is, "NO" in Step S33), a positive-side correction flag Fcp is set to OFF (Fcp=0) (Step S40).

In Processing Step S35, the correction determination unit 51 determines whether or not the counter cntp is smaller than a threshold value Cth. When the counter cntp is smaller than the threshold value Cth (that is, "YES" in Step S35), the positive-side correction flag Fcp is set to ON (Fcp=1) (Step S41). Meanwhile, when the counter cntp has reached the threshold value Cth (that is, "NO" in Step S35), the third positive-side flag F3p is set to OFF (F3p=0), and the counter cntp is reset to 0 (Step S36). After Processing Step S36, the positive-side correction flag Fcp is set to OFF (Fcp=0) (Step S40). The correction determination unit 51 outputs the positive-side correction flag Fcp determined in Processing Step S41 or Processing Step S40.

As described above, as a result of the configuration in which the correction to the estimated speed ω is continued while the counter cntp is smaller than the threshold value Cth, that is, until the predetermined set period specified by the threshold value Cth elapses, the correction is not momentary, but can be executed until the effect of the correction sufficiently appears.

The processing by the correction determination unit 51 when the first negative-side flag F1m is ON is mainly different in the processing in Step S24. In Step S24, it is determined whether or not the hold determination signal Tc is smaller than a negative threshold −α2. In the other processing, similar processing is executed while the suffix of each variable is changed from p to m, and a negative-side correction flag Fcm is output.

Figure 8:
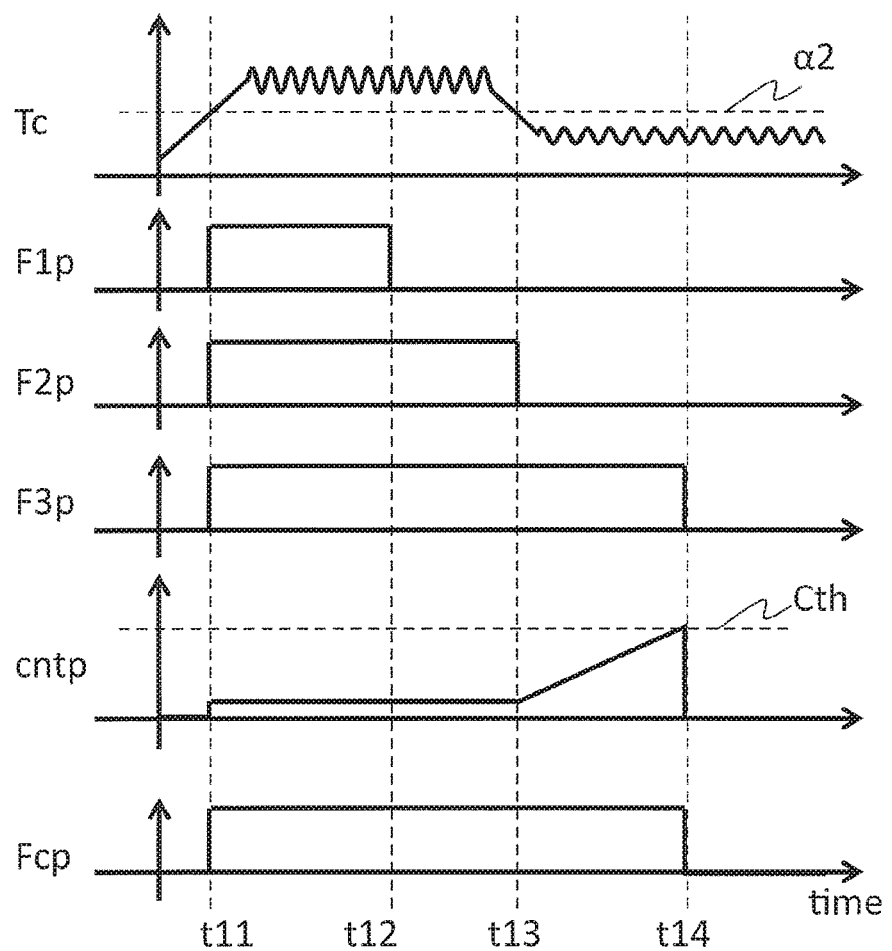
FIG. 8 is time charts for illustrating an example of temporal changes in respective flags in the first embodiment of the present invention.

FIG. 8 is time charts for illustrating an example of temporal changes in the respective flags in the first embodiment of the present invention. From the top of FIG. 8, the hold determination signal Tc, the first positive-side flag F1p, the second positive-side flag F2p, the third positive-side flag F3p, the counter cntp, and the positive-side correction flag Fcp are shown.

The positive-side correction flag Fcp is determined based on the hold determination signal Tc and the first positive-side flag F1p in accordance with the processing described with reference to FIG. 7. When the first positive-side flag F1p is set to ON at a time point t11, the second positive-side flag F2p is set to ON in Processing Step S21. When the first positive-side flag F1p is ON, the hold determination signal Tc obviously satisfies the relationship of Tc>α2, and the third positive-side flag F3p is thus set to ON in Processing Step S31. Further, the third positive-side flag F3p is ON, and the counter cntp is thus incremented to cntp=1 in Processing Step S34. The counter cntp satisfies a relationship of cntp<Cth, and the positive-side correction flag Fcp is thus set to ON in Processing Step S41.

A case in which the first positive-side flag F1p is set to OFF at a time point t12 is now considered. Even when the first positive-side flag F1p is set to OFF, the previous value of the second positive-side flag F2p is held, and the second positive-side flag F2p remains ON in Processing Step S22. The hold determination signal Tc satisfies the relationship of Tc>Δ2 at the time point t12, and hence the third positive-side flag F3p remains ON, and the counter cntp is reset to 0 in Processing Step S31. The third positive-side flag F3p is ON, and the counter cntp is thus incremented to cntp=1 in Processing Step S34. The counter cntp satisfies the relationship of cntp<Cth, and the positive-side correction flag Fcp thus remains ON in Processing Step S41.

When the hold determination signal Tc satisfies a relationship of Tc≤α2 at a time point t13, the second positive-side flag F2p is set to OFF in Processing Step S25. Moreover, the previous value of the third positive-side flag F3p is held, and the third positive-side flag F3p remains ON in Processing Step S32. The third positive-side flag F3p is ON, and the counter cntp is thus incremented in Processing Step S34. On this occasion, the counter cntp is not reset in Processing Step S31, and the counter cntp gradually increases. The counter cntp satisfies the relationship of cntp<Cth, and the positive-side correction flag Fcp thus remains ON in Processing Step S41. When the counter cntp reaches the threshold value Cth at a time point t14, the third positive-side flag F3p is set to OFF, and the counter cntp is reset in Processing Step S36. Further, the positive-side correction flag Fcp is set to OFF in Processing Step S40.

Figure 9:
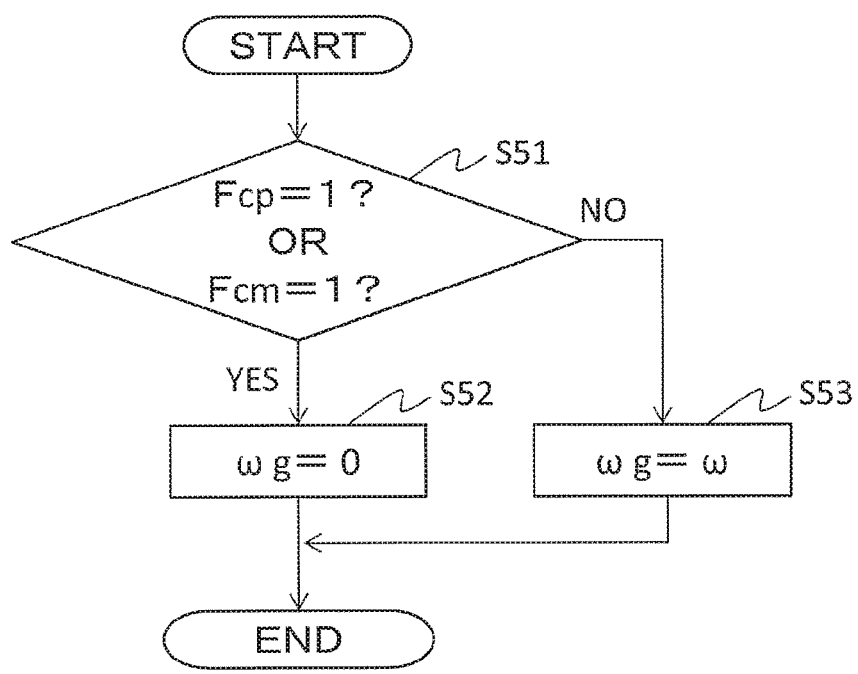
FIG. 9 is a flowchart for illustrating an example of processing by a correction execution unit in the first embodiment of the present invention.

FIG. 9 is a flowchart for illustrating an example of the processing by the correction execution unit 52. The correction execution unit 52 corrects the estimated speed ω to 0 so that the estimated speed ωg after the correction is 0 when the positive-side correction flag Fcp or the negative-side correction flag Fcm, which is the output of the correction determination unit 51, is ON (Fcp=1 or Fcm=1) (that is, "YES" in Step S51) (Step S52). Otherwise (that is, "NO" in Step S51), the estimated speed ω is used so as to output the estimated speed ωg=ω after the correction (Step S53). Then, the estimated angle calculation unit 6 integrates the estimated speed ωg after the correction, to thereby calculate the estimated angle θ.

As described above, according to the first embodiment of the present invention, there can be configured the electric power steering apparatus including: the steering torque detection unit configured to detect the steering torque of the driver; the motor configured to assist the steering force of the driver; the estimated speed calculation unit configured to calculate the estimated speed, which is the estimated value of the rotation speed of the motor; the estimated speed correction unit configured to correct the estimated speed based on the steering torque; the estimated angle calculation unit configured to calculate the estimated angle of the motor by integrating the estimated speed after the correction; and the electric power supply unit configured to supply electric power to the motor based on the estimated angle, wherein the estimated speed correction unit is configured to correct the estimated speed when the determination signal, which is based on the value obtained by removing the frequency component of the steering of the driver from the derivative of the steering torque, the steering torque, and the estimated speed have the same signs.

With this configuration, it can be determined that the estimation errors $\Delta\omega$ and $\Delta\theta$ currently occur in the estimated speed $\omega$ and the estimated angle $\theta$ when the determination signal Tdj, which is based on the value obtained by removing the frequency component of steering by the driver from the derivative Td of the steering torque, the steering torque Trq, and the estimated speed $\omega$ have the same signs.

First, the direction of the steering by the driver and an increase and a decrease in the steering torque can be recognized from the sign of the steering torque Trq and the sign of the derivative Td of the steering torque. Thus, when the sign of the steering torque Trq and the sign of the derivative Td of the steering torque are the same signs, it can be determined that the magnitude of the steering torque Trq is increasing. For example, when both of the sign of the steering torque Trq and the sign of the derivative Td of the steering torque are positive, it can be determined that the magnitude of the steering torque Trq is increasing during a rightward steering.

Further, when the sign of the determination signal Tdj obtained by removing the frequency component of the steering of the driver from the derivative Td of the steering torque and the sign of the estimated speed $\omega$ are the same signs, it can be determined that the motor torque Tm is reduced by an increase in an error in the estimated angle $\theta$ due to the error $\Delta\theta$ in the estimated speed $\omega$, and the steering torque Trq is consequently increased. This determination is based on such a fact that the derivative Td of the steering torque and the rotation speed $\omega e$ of the motor correlate with each other, and positive and negative signs thereof are opposite to each other in a frequency band higher than the frequency of the steering of the driver. That is, when the signs are the same signs, it can be determined that the estimated speed $\omega$ contains an error. In addition, through use of the value obtained by removing the frequency component of the steering of the driver from the derivative Td of the steering torque as the determination signal Tdj, a change in the motor torque Tm contained in the detected steering torque Trq can be extracted, and hence it can be distinguished for the determination whether the increase in the detected steering torque Trq is caused by an increase in a force of the driver or a decrease in the motor torque Tm.

The increase in the error $\Delta\theta$ in the estimated angle $\theta$ can be determined by the above-mentioned determination, and hence the error $\Delta\theta$ in the estimated angle $\theta$ can be reduced by correcting the estimated speed $\omega$. The error $\Delta\theta$ in the estimated angle can be reduced, and hence a torque fluctuation caused by the error in the estimated angle $\Delta\theta$ can be suppressed. Therefore, the electric power steering apparatus capable of achieving stable sensorless control with a small vibration can be provided.

Further, the estimated speed correction unit 5 is configured to correct the estimated speed $\omega$ when the magnitude, namely, the absolute value, of the determination signal Tdj is equal to or larger than the threshold value. It is possible to determine whether or not the steering torque Trq has greatly changed due to the estimation error $\Delta\theta$ by determining whether or not the magnitude, namely, the absolute value, of the determination signal Tdj is equal to or larger than the threshold value, and hence the accuracy of the determination increases.

The estimated speed correction unit 5 is configured to correct the estimated speed $\omega$ to 0 when the positive-side correction flag Fcp or the negative-side correction flag Fcm is set to ON. When the correction flag Fcp or Fcm is set to ON, the direction of the estimated speed $\omega$ becomes the opposite direction with respect to the actual rotation speed $\omega e$, and hence it is possible, by setting the estimated speed $\omega$ to zero, to prevent a state in which the erroneous estimated speed $\omega$ is integrated, and the error $\Delta\theta$ of the estimated angle $\theta$ consequently increases.

Further, the correction is not momentary, but can be continued until the effect of the correction sufficiently appears by continuing the correction until the set period elapses.

Further, an increase and a decrease in the estimated error $\Delta\theta$ contained in the estimated angle $\theta$ appears in the steering torque Trq as a result of the fluctuation of the motor torque Tm. Thus, it is possible to determine whether or not the effect of the correction appears based on the derivative Td of the steering torque through use of such a configuration that the correction to the estimated speed $\omega$ is continued until the correction release condition based on the derivative Td of the steering torque is satisfied. Therefore, the correction can be continued until the effect of the correction appears.

Figure 10:
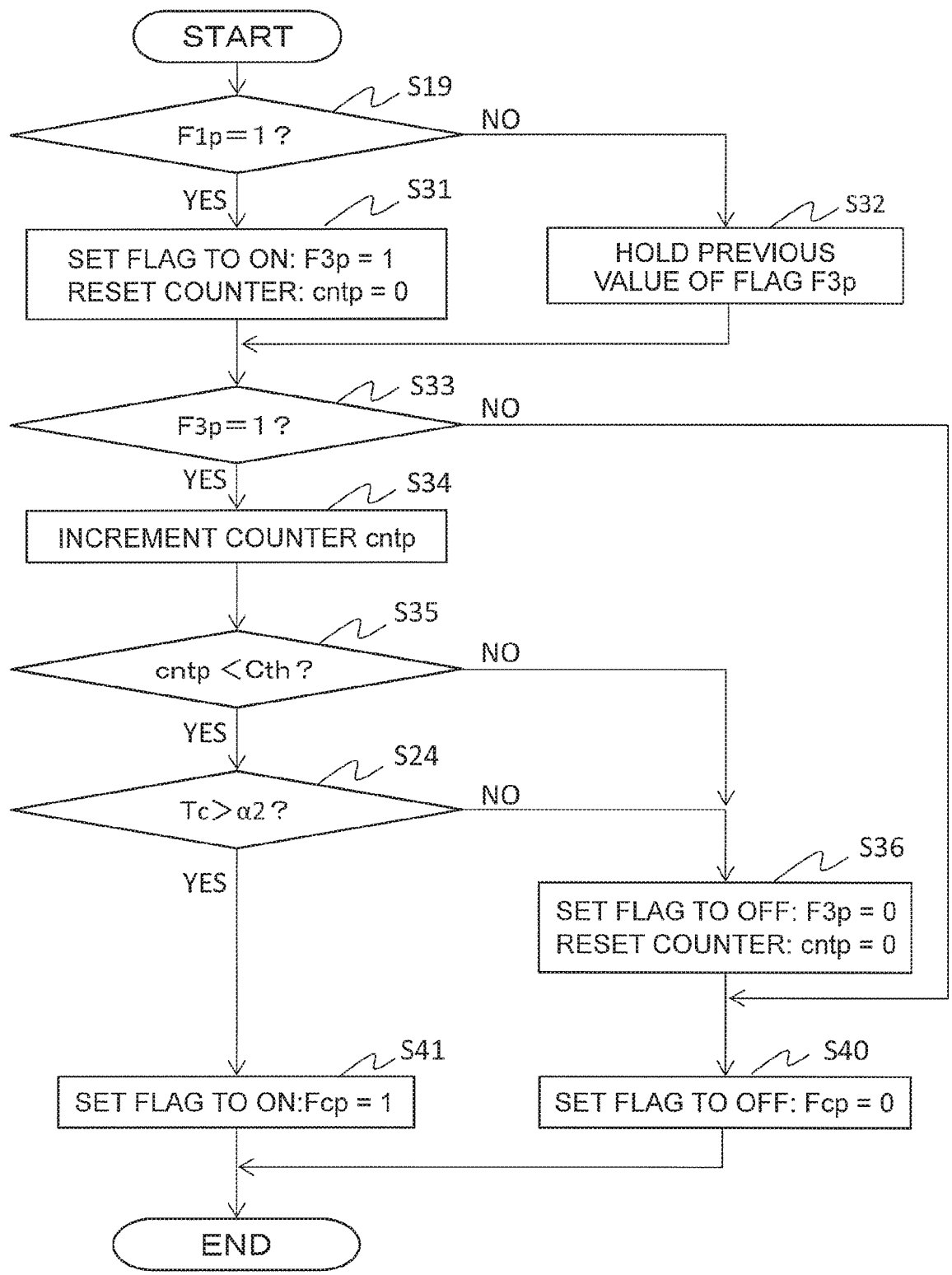
FIG. 10 is a flowchart for illustrating an example of processing of the determination based on the correction release condition and the determination based on the time elapse in processing by the correction determination unit in a modification example of the first embodiment of the present invention.

The processing of holding the flags in the correction determination unit 51 may be rearranged, for example, as described below. FIG. 10 is a flowchart for illustrating a modification example of the determination based on the correction release condition and the determination based on the time elapse. In this case, the determination based on the correction release condition and the determination based on the time elapse are changed in processing as described below.

First, it is determined whether or not the first positive-side flag F1$p$ is ON (F1$p$=1) (Step S19). When the first positive-side flag F1$p$ is ON (F1$p$=1) (that is, "YES" in Step S19), the third positive-side flag is set to ON (F3$p$=1), and the counter cntp is reset to 0 (Step S31). Then, the processing proceeds to Processing Step S33. Meanwhile, when the first positive-side flag F1$p$ is OFF (F1$p$=0) (that is, "NO" in Step S19), the third positive-side flag F3$p$ holds the previous value (Step S32). Then, the processing proceeds to Processing Step S33.

In Processing Step S33, the correction determination unit 51 determines whether or not the third positive-side flag is ON (F3$p$=1). When the third positive-side flag is ON (F3$p$=1) (that is, "YES" in Step S33), the counter cntp is incremented (Step S34), and the processing proceeds to Processing Step S35. Meanwhile, when the third positive-side flag is OFF (F1$p$=0) (that is, "NO" in Step S33), the positive-side correction flag Fcp is set to OFF (Fcp=0) (Step S40).

In Processing Step S35, the correction determination unit 51 determines whether or not the counter cntp is smaller than the threshold value Cth. When the counter cntp is smaller than the threshold value Cth (that is, "YES" in Step S35), the processing proceeds to the determination in Processing Step S24. Meanwhile, when the counter cntp has reached the threshold value Cth (that is, "NO" in Step S35), the third positive-side flag F3$p$ is set to OFF (F3$p$=0), and the counter cntp is reset to 0 (Step S36). Then, the positive-side correction flag Fcp is set to OFF (Fcp=0) (Step S40).

In Processing Step S24, the correction determination unit 51 determines whether or not the hold determination signal Tc is larger than the threshold value $\alpha 2$. When the hold determination signal Tc is larger than the threshold value $\alpha 2$ (that is, "YES" in Step S24), the positive-side correction flag Fcp is set to ON (F3$p$=1) (Step S41).

Meanwhile, when the hold determination signal Tc is equal to or smaller than the threshold value $\alpha 2$ (that is, "NO"

in Step S24), the third positive-side flag F3p is set to OFF (F3p=0), and the counter cntp is reset to 0 (Step S36). Then, the positive-side correction flag Fcp is set to OFF (Fcp=0) (Step S40).

The following effects are provided also in the above-mentioned configuration.

The correction to the estimated speed ω is continued until the correction release condition is satisfied, that is, while the hold determination signal Tc is larger than the threshold value α2, by setting the correction release condition through use of the hold determination signal Tc based on the derivative Td of the steering torque. An increase and a decrease in the error Δθ in the estimated angle θ appears in the steering torque Trq, and hence it is possible to determine whether or not the effect of the correction appears based on the derivative Td of the steering torque. Thus, the correction can be continued until the effect of the correction appears.

As a result of the configuration in which the correction to the estimated speed ω is continued while the counter cntp is smaller than the threshold value Cth, that is, until the set period specified by the threshold value Cth elapses, the correction is not momentary, but can be executed until the effect of the correction sufficiently appears.

Further, even while the correction is continued, that is, the third positive-side flag F3p is held to be ON, the flag can quickly be set to OFF to stop the correction when the correction release condition based on the hold determination signal Tc is satisfied, by consequently executing the processing of determining whether or not to continue the correction based on the hold determination signal Tc in Processing Step S24. Therefore, there is provided such an additional effect that, even when the set period specified by the threshold value Cth is set to be unnecessarily long, it is possible to reduce such a possibility that an unnecessary correction is made due to the continuation of the correction, and an adverse effect consequently occurs.

Figure 11:
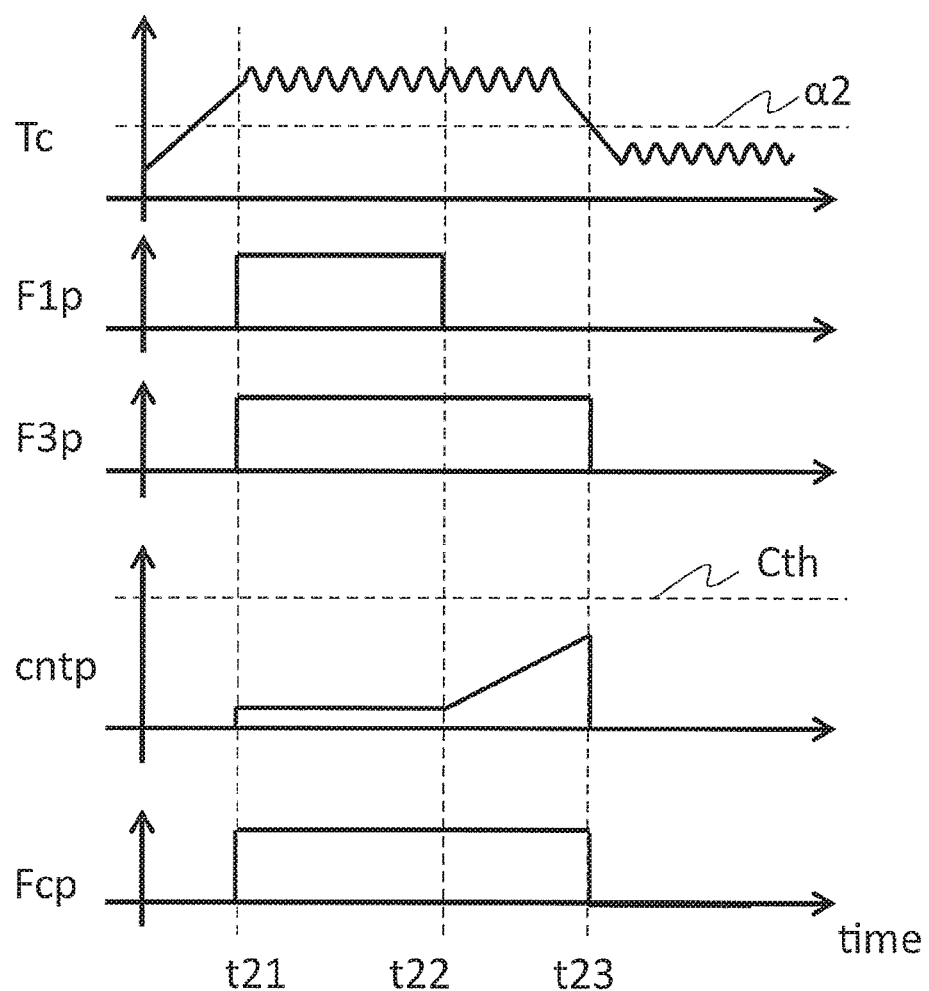
FIG. 11 is time charts for illustrating an example of temporal changes in the respective flags in a modification example of the first embodiment of the present invention.

FIG. 11 is time charts for illustrating temporal changes in the respective flags in a modification example of the first embodiment of the present invention. From the top of FIG. 11, the hold determination signal Tc, the first positive-side flag F1p, the second positive-side flag F2p, the third positive-side flag F3p, the counter cntp, and the positive-side correction flag Fcp are shown. The positive-side correction flag Fcp is determined based on the hold determination signal Tc and the first positive-side flag F1p in accordance with the processing described with reference to FIG. 10. When the first positive-side flag F1p is set to ON at a time point t21, the third positive-side flag F3p is set to ON in Processing Step S31. Further, after the counter cntp is once reset to cntp=0, the third positive-side flag F3p is ON, and the counter cntp is thus incremented to cntp=1 in Processing Step S34. The counter cntp satisfies the relationship of cntp<Cth, the hold determination signal Tc also satisfies the relationship of Tc>α2, and the positive-side correction flag Fcp is thus set to ON in Processing Step S41. When the first positive-side flag F1p is ON, the hold determination signal Tc obviously satisfies the relationship of Tc>α2.

A case in which the first positive-side flag F1p is set to OFF at a time point t22 is considered now. Even when the first positive-side flag F1p is set to OFF, the previous value of the third positive-side flag F3p is held, and the third positive-side flag F3p remains ON in Processing Step S32. However, the counter cntp is not reset. The third positive-side flag F3p is ON, and the counter cntp is thus incremented in Processing Step S34. In this state, the counter cntp is not reset, and thus gradually increases. While the counter cntp satisfies the relationship of cntp<Cth, and the hold determi-nation signal Tc satisfies the relationship of Tc>α2, the positive-side correction flag Fcp remains ON.

Then, when the hold determination signal Tc satisfies the relationship of Tc≤α2 at a time point t23, the third positive-side flag F3p is set to OFF, and the counter cntp is reset in Processing Step S36. Further, the positive-side correction flag Fcp is set to OFF in Processing Step S40. In this case, the configuration described with reference to FIG. 10 is characterized in that the positive side correction flag Fcp is set to OFF when the hold determination signal Tc satisfies the relationship of Tc≤α2 even when the counter cntp has not reached the threshold value Cth, and is different in this point from the configuration described with reference to FIG. 7.

FIG. 7 and FIG. 10 are flowcharts for illustrating respective examples of the correction determination unit 51. The flow is not limited to the flow separated from that of FIG. 6 as in this embodiment, and it should be understood that the same effects are provided as long as the positive-side correction flag Fcp and the negative-side correction flag Fcm are determined in a similar manner.

Second Embodiment

Figure 12:
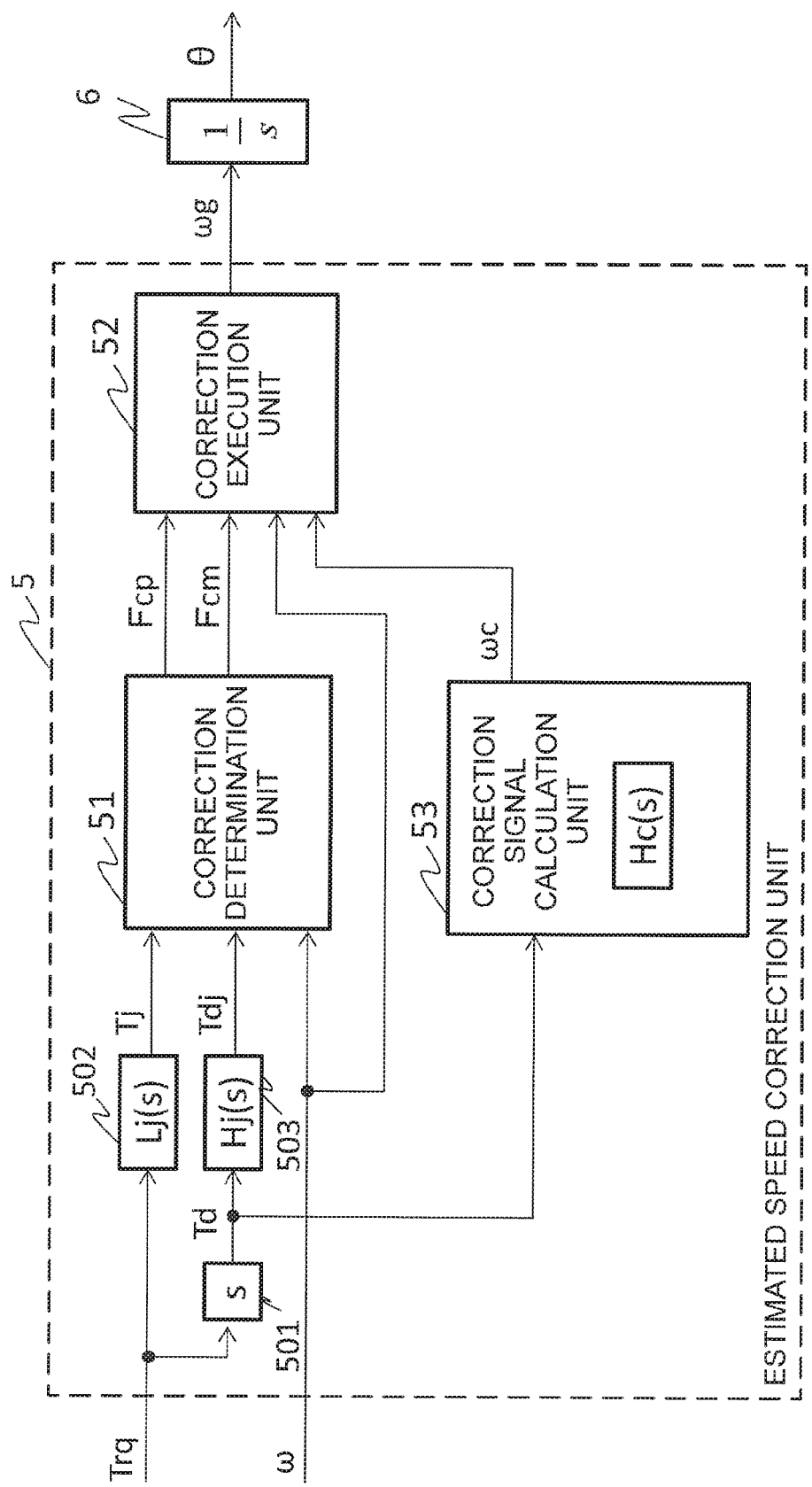
FIG. 12 is a functional block diagram for illustrating an example of configurations of the estimated speed correction unit and the estimated angle calculation unit in a second embodiment of the present invention.

A second embodiment of the present invention is different from the first embodiment in the configuration of the estimated speed correction unit 5, and the remaining configurations are the same as those of the first embodiment. Specifically, the second embodiment is different from the first embodiment in the processing by the correction execution unit 52 in the estimated speed correction unit 5, and in that the estimated speed correction unit 5 includes a correction signal calculation unit 53. FIG. 12 is a functional block diagram for illustrating an example of configurations of the estimated speed correction unit 5 and the estimated angle calculation unit 6 configured to calculate the estimated angle θ, which is the control angle of the motor, in the second embodiment of the present invention. The correction signal calculation unit 53 calculates a value obtained by multiplying the derivative (s·Trq=Td) of the steering torque by a conversion gain as a correction signal ωc. Further, the correction execution unit 52 is different from that of the first embodiment in the value for correcting the estimated speed ω when the positive-side correction flag Fcp or the negative-side correction flag Fcm is ON, corrects the estimated speed ω through use of the correction signal ωc.

As described above, the derivative Td of the steering torque and the rotation speed ωe of the motor correlate with each other as can be found from the approximation given by Expression (11). Therefore, this correlation is used so as to correct the estimated speed ω. That is, the estimated speed ω is corrected by the correction signal ωc obtained by multiplying the derivative (s·Trq=Td) of the steering torque by the conversion gain k.

As given by Expression (14), the correction signal ωc is calculated by multiplying the derivative (s·Trq) of the steering torque by the conversion gain k given by Expression (10). Further, the signal corresponding to the rotation speed ωe of the motor can more accurately be obtained by applying a filter Hc(s) for removing the frequency component of the steering of the driver as given by Expression (14). In this case, the filter Hc(s) is set by a first-order high-pass filter given by Expression (15). A cutoff frequency ωhc is only required to be set so as to remove the frequency component of the steering of the driver. When the cutoff frequency is set to, for example, 3 Hz, the filter Hc(s) has the same characteristic as that of the filter Hj(s) shown in FIG. 5A, and hence the frequency component of the steering of the driver can be removed.

$$\omega_c = H_c(s) \cdot k \cdot s \cdot Trq \quad (14)$$

$$H_c(s) = \frac{s}{s + \omega_{hc}} \quad (15)$$

In the second embodiment, when the positive-side correction flag Fcp is ON, it is determined that the estimated speed ω is higher than the actual rotation speed ωe, and the estimated speed ω is corrected to a lower value. For example, the estimated speed ω can be corrected to a lower value by using the correction signal ωc to limit an upper limit value.

Figure 13:
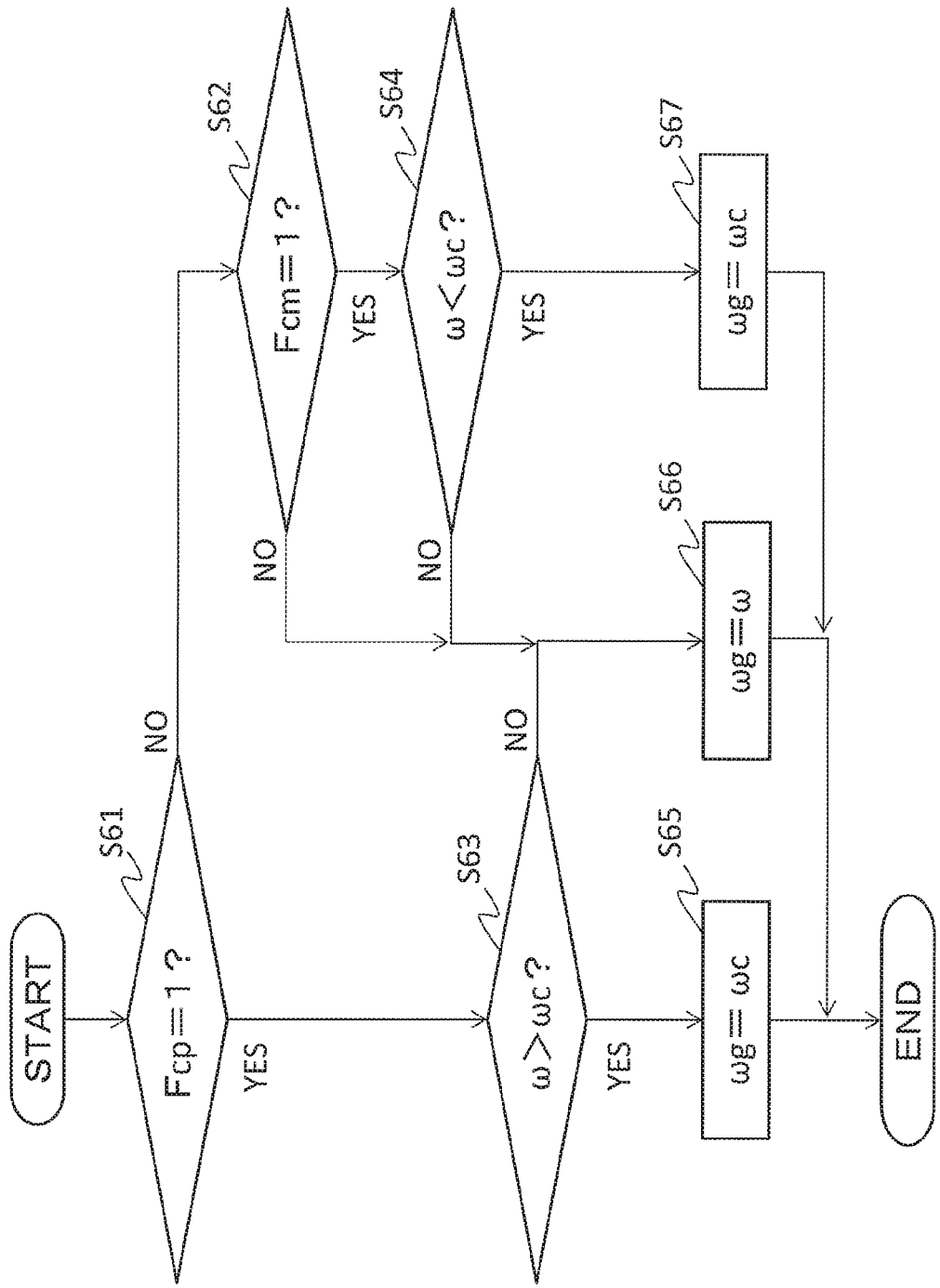
FIG. 13 is a flowchart for illustrating an example of processing by the correction execution unit in the second embodiment of the present invention.

FIG. 13 is a flowchart for illustrating an example of the processing by the correction execution unit 52 in the second embodiment of the present invention. When the positive-side correction flag Fcp, which is the output of the correction determination unit 51, is ON (Fcp=1) (that is, "YES" in Step S61), the processing proceeds to Processing Step S63. When the positive-side correction flag Fcp is OFF (Fcp=0) (that is, "NO" in Step S61), the processing proceeds to Processing Step S62.

In Processing Step S63, the correction determination unit 51 determines whether or not the estimated speed ω is higher than the correction signal ωc, which is described later, to thereby limit the upper limit value of the estimated speed ωg. When ω>ωc (that is, "YES" in Processing Step S63), the upper limit value of the estimated speed ω is limited, and the estimated speed ωg=ωc after the correction is output (Step S65). As a result, the estimated speed ωg after the correction can be corrected to a lower value. Meanwhile, when ω≤ωc (that is, "NO" in Processing Step S63), the estimated speed ω is directly used, and the estimated speed ωg=ω after the correction is output (Step S66).

In Processing Step S62, when the negative-side correction flag Fcm is ON (Fcm=1) (that is, "YES" in Step S62), the processing proceeds to Processing Step S64. Meanwhile, when the negative-side correction flag Fcm is OFF (Fcm=0) (that is, "NO" in Step S62), the positive-side correction flag Fcp and the negative-side correction flag Fcm are OFF, and hence the correction execution unit 52 outputs the estimated speed ωg=ω after the correction in Processing Step S66, which is described above.

In Processing Step S64, the correction determination unit 51 determines whether or not the estimated speed ω is lower than the correction signal ωc, which is described later, to thereby limit the lower limit value of the estimated speed ω. When ω<ωc (that is, "YES" in Processing Step S64), the lower limit value of the estimated speed ω is limited, and the estimated speed ωg=ωc after the correction is output (Step S67). As a result, the estimated speed ωg after the correction can be corrected to a higher value. Meanwhile, when ω≥ωc (that is, "NO" in Processing Step S64), the estimated speed ω is directly used, and the estimated speed ωg=ω after the correction is output (Step S66).

As described above, the estimated speed correction unit 5 is configured to correct the estimated speed ω through use of the correction signal ωc obtained by multiplying the derivative Td of the steering torque by the conversion gain k. As a result, the correlation between the rotation speed ωe of the motor and the derivative Td of the steering torque are used so as to be able to make a more accurate correction. The remaining configurations, which are the same as those of the first embodiment, provide the same effects as those of the first embodiment.

Third Embodiment

Figure 14:
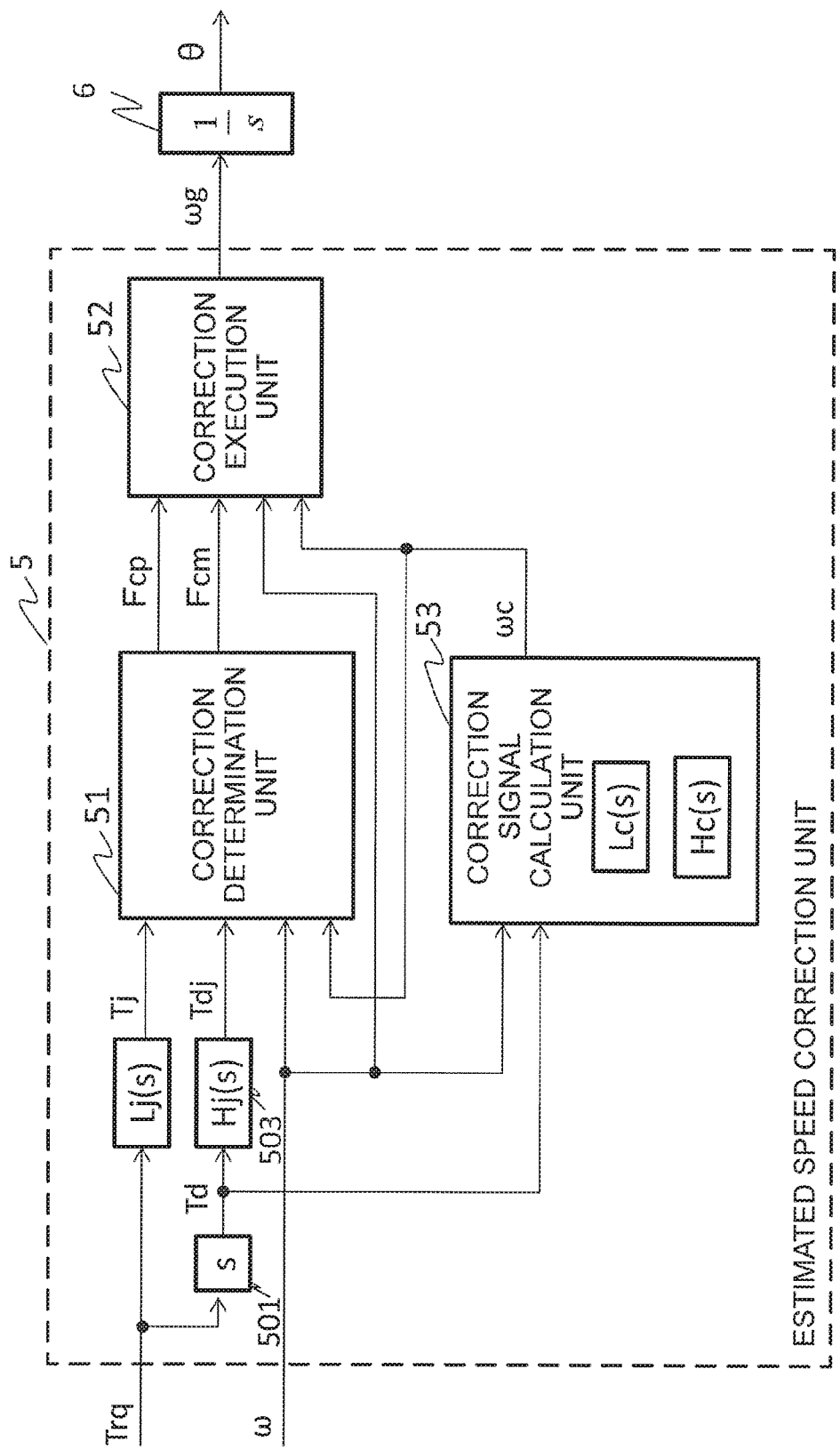
FIG. 14 is a functional block diagram for illustrating an example of configurations of the estimated speed correction unit and the estimated angle calculation unit in a third embodiment of the present invention.

A third embodiment of the present invention is different from the first embodiment and the second embodiment in the configuration of the estimated speed correction unit 5, and the remaining configurations are the same as those of the first embodiment and the second embodiment. Specifically, the third embodiment is different from the first embodiment and the second embodiment in the processing by the correction execution unit 52 included in the estimated speed correction unit 5, and the method of calculating the correction signal ωc, which is the output of the correction signal calculation unit 53. FIG. 14 is a functional block diagram for illustrating an example of the configurations of the estimated speed correction unit 5 and the estimated angle calculation unit 6 configured to calculate the estimated angle θ, which is the control angle of the motor, in the third embodiment of the present invention.

The correction signal ωe is calculated as a sum of a first correction signal ω1 and a second correction signal ω2 as given by Expression (16). Similarly to Expression (14) in the second embodiment, the first correction signal ω1 is calculated by multiplying the value obtained by applying the filter Hc(s) so as to remove the frequency component of the steering of the driver from the derivative (s·Trq=Td) of the steering torque by the conversion gain k as given by Expression (17). Moreover, the second correction signal ω2 is calculated by applying a filter Lc(s) so as to extract the frequency component of the steering of the driver from the estimated speed ω as given by Expression (18). The filter Lc(s) is set as given by Expression (19) based on the filter Hc(s). As a result, the component of the frequency higher than the frequency component of the steering of the driver is removed from the original signal, to thereby be able to extract the frequency component of the steering of the driver.

$$\omega_c = \omega_{c1} + \omega_{c2} \quad (16)$$

$$\omega_{c1} = H_c(s) \cdot k \cdot s \cdot Trq \quad (17)$$

$$\omega_{c2} = L_c(s) \cdot \omega \quad (18)$$

$$L_c(s) = 1 - H_c(s) = \frac{\omega_{hc}}{s + \omega_{hc}} \quad (19)$$

Further, when the filter Lc(s) is set as given by Expression (19), a sum of the filter Hc(s) and the filter Lc(s) is 1, and the original input signal can thus be restored. That is, there is provided such an additional effect that the original estimated speed can be restored through use of the sum of the first correction signal ω1 and the second correction signal ω2 when the estimated speed ω does not contain an error.

With such a configuration that the frequency component of the steering of the driver, which serves as a basic component of the rotation speed ωe of the motor, is calculated from the estimated speed ω, and the frequency component higher than the frequency component of the steering of the driver is calculated from the derivative Td of the steering torque, the correction signal ωe can be calculated as the signal corresponding to the actual rotation speed ωe. While the estimated speed ω is used for the calculation of the second correction signal ωc2 in Expression (18), a similar effect is also provided when the estimated speed ωg after the correction is used.

In the correction signal calculation unit 53 in the third embodiment, in addition to the configuration of determining whether or not the estimated speed ω, the steering torque Tj for the determination, and the determination signal Td have the same signs, which is described in the first embodiment, it is also determined whether or not the sign of the estimated speed ω and the sign of a determination speed ωj are opposite signs.

In this case, as a signal to be used as the determination speed ωj, which is a determination signal, the correction signal ωc given by Expression (16) calculated from the derivative of the steering torque is used for the sake of simple calculation. That is, the determination speed ωj is set to be equal to the correction signal ωc. The determination speed ωj is a value calculated as a signal corresponding to the actual rotation speed, and is only required to be a value calculated by a method different from the calculation method for the estimated speed ω. Thus, the determination speed ωj may be calculated by a method different from that for the correction signal ωc.

FIG. 15 is a flowchart for illustrating the processing of determining whether or not the estimated speed ω, the determination steering torque Tj, and the determination signal Tdj have the same signs in the correction determination unit 51 in the third embodiment. In Processing Step S71p and Processing Step S71m, the correction determination unit 51 determines whether or not the sign of the estimated speed ω and the sign of the determination speed ωj are opposite signs. The state in which the sign of the estimated speed ω and the sign of the determination signal ωc calculated as the signal corresponding to the actual rotation speed ωe are opposite signs indicates that the error in the estimated speed ω is large, and thus indicates the necessity for the correction.

In Processing Step S71p, the processing proceeds to Processing Step S12p when the estimated speed ω is a positive value and the determination speed ωj is a negative value (that is, "YES" in Step S71P), and proceeds to Processing Step S71m otherwise (that is, "NO" in Step S71p).

In Processing Step S71m, the processing proceeds to Processing Step S12m when the estimated speed ω is a negative value and the determination speed ωj is a positive value (that is, "YES" in Step S71m), and proceeds to Processing Step S14 otherwise (that is, "NO" in Step S71m).

In Processing Step S12p, the correction determination unit 51 determines whether or not the steering torque Tj for the determination is a positive value and the determination signal Tdj is a positive value. In this state, it is only required to determine whether or not the determination signal Tdj is a positive value. However, in the third embodiment, it is determined whether or not the determination signal Tdj is larger than a positive threshold value α1 in order to more accurately determine a change in the torque Tm of the motor. As a result, it can be determined that the determination signal Tdj has greatly changed, that is, the torque Tm of the motor has greatly changed, and it can thus be found that the correction is required. When the steering torque Tj for the determination is a positive value, and the determination signal Tdj is larger than the positive threshold value α1 (that is, "YES" in Step S12p), the first positive-side flag F1p is set to ON (F1p=1), and the first negative-side flag F1m is set to OFF (F1m=0) (Step S13). In this state, the estimated speed ω, the steering torque Tj for the determination, and the determination signal Tdj are positive values and have the same signs. Moreover, the sign of the estimated speed ω and the sign of the determination speed ωj are opposite signs. Therefore, it is possible to determine that the correction is required. Meanwhile, when the condition that the steering torque Tj for the determination is a positive value and the determination signal Tdj is larger than the positive threshold value α1 is not satisfied (that is, "NO" in Step S12p), the processing proceeds to Processing Step S14.

In Processing Step S12m, it is determined that the steering torque Tj for the determination is a negative value, and the determination signal Tdj is a negative value. In this case, it is determined whether or not the determination signal Tdj is smaller than the negative threshold value −α1, to thereby determine whether or not the torque Tm of the motor has greatly changed. When the steering torque Tj for the determination is a negative value, and the determination signal Tdj is smaller than the negative threshold value −α1 (that is, "YES" in Step S12m), the first negative-side flag F1m is set to ON (F1m=1), and the first positive-side flag F1p is set to OFF (F1p=0) (Step S15). In this state, the estimated speed ω, the steering torque Tj for the determination, and the determination signal Tdj are negative values and have the same signs. Moreover, the sign of the estimated speed ω and the sign of the determination speed ωj are opposite signs. Therefore, it is possible to determine that the correction is required. Meanwhile, when the condition that the steering torque Tj for the determination is a negative value and the determination signal Tdj is smaller than the negative threshold value −α1 is not satisfied (that is, "NO" in Step S12m), the processing proceeds to Processing Step S14.

In Processing Step S14, the first positive-side flag F1p and the first negative-side flag F1m are set to OFF (F1p=0 and F1m=0) (Step S14).

In the subsequent processing, the estimated speed ω is corrected as in the second embodiment based on the first positive-side flag F1p and the first negative-side flag F1m, to thereby calculate the estimated speed ωg after the correction.

With the above-mentioned configuration, the estimated speed correction unit 5 is configured to correct the estimated speed ω through use of the sum ωc1+ωc2=ωc of the first correction signal ωc1 calculated from the derivative s·Trq of the steering torque and the second correction signal ωc2 calculated from the estimated speed ω. Further, the first correction signal ωc1 is calculated by multiplying the value obtained by applying the filter Hc(s) so as to remove the frequency component of the steering of the driver from the derivative s·Trq of the steering torque by the conversion gain k, and the second correction signal is calculated by applying the filter Lc(s) to the estimated speed ω so as to extract the frequency component of the steering of the driver. This configuration uses the fact that the rotation speed ωe of the motor and the derivative s·Trq of the steering torque correlate with each other, and the value corresponding to the actual rotation speed ωe can thus be obtained. Further, the estimated speed ω is corrected through use of the correction signal ωc calculated as the sum of the first correction signal ωc1 and the second correction signal ωc2, thereby being able to make a highly accurate correction.

In the third embodiment, it is determined that the correction to the estimated speed ω is required when the sign of the estimated speed ω and the sign of the correction signal ωc are opposite signs, but this condition may be replaced by another condition. For example, when a difference between the estimated speed ω and the correction signal ωc is larger than a set value α3 defined in advance, that is, when $|\omega-\omega c|>\alpha 3$, it may be determined that the correction is required. Also in this case, it is found that the estimated speed $\omega$ contains an error, and the correction is thus required.

Moreover, the first embodiment to the third embodiment may be modified as described below.

Figure 18:
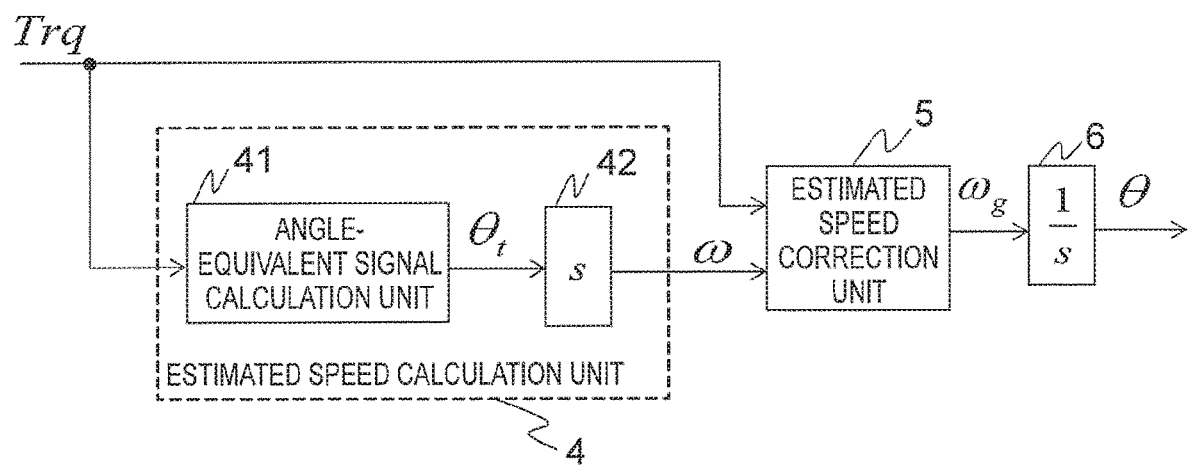
FIG. 18 is a functional block diagram for illustrating an example of configurations of the estimated speed correction unit and the estimated angle calculation unit in a case where an estimated speed w is calculated by an estimation method that is based on the steering torque in a modification example of the first embodiment to the third embodiment of the present invention.

In the first embodiment to the third embodiment, the calculation of the estimated speed $\omega$ is executed by the method of using the induced voltage for the estimation as in Patent Literature 3, but the estimation method is not particularly limited. As long as the calculation method for the estimated speed $\omega$ and the calculation method for the determination signal Tdj are different from each other, the method is not limited to the method of using the induced voltage for the estimation, and even when the estimated speed $\omega$ is calculated by another method, a desired correction can be achieved. For example, as described in Patent Literature 2, an estimation method that is based on the steering torque detected by the torque sensor may be used. The estimation method in Patent Literature 2 causes the motor 1 to generate a high-frequency torque Tmhf, and calculates an angle-equivalent signal θt based on a response appearing in the steering torque Trq detected by the torque sensor 102. The estimated speed $\omega$ is obtained by differentiating the angle-equivalent signal θt once. FIG. 18 is a functional block diagram for illustrating an example of configurations of the estimated speed correction unit 5 and the estimated angle calculation unit 6 in a case where the estimated speed $\omega$ is calculated by the estimation method that is based on the steering torque. In an angle-equivalent signal calculation unit 41, the angle-equivalent signal θt is calculated based on the steering torque Trq. In a differentiation calculation unit 42, the angle-equivalent signal θt is differentiated once, to thereby obtain the estimated speed $\omega$. Then, it is only required to apply the processing by the estimated speed correction unit 5 to the estimated speed $\omega$ and integrate the estimated speed $\omega$g after the correction, to thereby calculate the estimated angle θ.

The high-frequency torque Tmhf is generated by supplying a d-axis current command id* and a q-axis current command iq* given by Expression (20). The d-axis current command id* is obtained by adding a d-axis high-frequency current command Aid to a d-axis basic current command id0*. Moreover, the q-axis current command iq* is obtained by adding a q-axis high-frequency current command Aiq to a q-axis basic current command iq0*. The d-axis basic current command id0* is determined based on, for example, the rotation speed $\omega$e of the motor. Moreover, the q-axis basic current command iq0* is determined based on, for example, the steering torque Trq. The d-axis high-frequency current command Aid and the q-axis high-frequency current command Aiq are given by a cosine wave and a sine wave, respectively, each having an amplitude A and a frequency ww. The cosine wave and the sine wave are set to functions of the time t.

$$\begin{cases} id^* = id0^* + Aid \\ iq^* = iq0^* + Aiq \\ Aid = A \cdot \cos(ww \cdot t) \\ Aiq = A \cdot \sin(ww \cdot t) \end{cases} \quad (20)$$

In the following, for the sake of simple description, the d-axis basic current command id0* and the q-axis basic current command iq0* are set to 0. The output torque Tm of the motor is provided almost in proportion to the q-axis current command iq*. Therefore, when the estimation error Δθ does not exist, the high-frequency torque Tmhf proportional to a q-axis high-frequency current command Aiq* is generated as given by Expression (21) by supplying the electric power to the motor 1 based on Expression (20). In the expression, Kt represents a proportional constant of the output torque of the motor.

$$Tmhf = Kt \cdot A \cdot \sin(ww \cdot t) \quad (21)$$

Meanwhile, when the estimation error Δθ exists, a phase difference Δθq occurs between the q-axis high-frequency current Aiq and the high-frequency torque Tmhf as given by Expression (22). Thus, the phase difference Δθq between the q-axis high-frequency current Aiq and the high-frequency torque Tmhf is a signal containing information on the estimation error Δθ.

$$Tmhf = Kt \cdot A \cdot \sin(ww \cdot t + \Delta\theta q) \quad (22)$$

The angle-equivalent signal θt can be calculated through use of the fact that the phase difference Δθq contains the information on the estimation error Δθ. The high-frequency torque Tmhf is reflected to the steering torque Trq detected by the torque sensor 102, and hence the phase difference Δθq can be calculated based on the steering torque Trq. The calculation of the angle-equivalent signal θt is executed by feedback control given by Expression (23) and Expression (24) so that the phase difference Δθq calculated based on the steering torque Trq decreases.

$$\theta_t = \left(kpp + \frac{kii}{s}\right) \cdot \Delta\theta q \quad (23)$$

$$\omega = s \cdot \theta_t \quad (24)$$

In the expression, kpp and kii represent feedback gains for calculating the angle-equivalent signal θt.

In the case of this estimation method, for example, an estimation delay causes the estimation error Δθ. In this estimation method, the estimated speed $\omega$ is calculated by differentiating the angle-equivalent signal θt calculated based on the steering torque Trq, which is a method different from the calculation of the determination signal Tdj. Thus, this estimation method can reduce the estimation error Δθ by determining whether or not to make the correction based on the determination signal Tdj, to thereby be able to suppress the torque fluctuation caused by the estimation error Δθ.

However, in the second embodiment or the third embodiment, it is the condition for obtaining the effect of the correction that the correction signal $\omega$e is also calculated through use of a calculation method different from that for the estimated speed $\omega$.

In the second embodiment or the third embodiment, the upper limit value for the estimated speed $\omega$ is limited when the positive-side correction flag Fcp is ON, but the estimated speed $\omega$g after the correction may be $\omega$g=$\omega$c independently of the value of the estimated speed $\omega$. Also with this configuration, the correction signal $\omega$c is a value corresponding to the actual rotation speed $\omega$e, and the estimation error Δθ can thus be reduced.

In the second embodiment or the third embodiment, for the correction signal $\omega$c calculated as given by Expression (14) or the correction signal $\omega$c calculated as given by Expression (16) to Expression (18), the conversion gain k may be set to be larger than that set by Expression (10). As a result, the estimated angle θ can be caused to quickly reach the actual rotation angle by increasing the magnitude of the estimated speed ωg after the correction, to thereby be able to reduce the error in the estimated angle θ.

Further, the conversion gain k may be initially set to be relatively large, and may then be gradually reduced. As a result, the estimated angle θ can be caused to reach the actual rotation angle θe by setting the magnitude of the estimated speed ωg after the correction to a large value at first, and the estimated speed ω can then be corrected based on a value equivalent to the actual rotation speed ωe by gradually reducing the conversion gain k as the time elapses.

The filters Hj(s), Hc(s), Lj(s), and Lc(s) in the first embodiment to the third embodiment may be modified as described below.

(1) Modification Example of Cutoff Frequencies of Filters

In the filters Hj(s) and Hc(s) in the embodiments, the cutoff frequencies ωhj and ωhc are set to 3 Hz as the frequency higher than the frequency of the steering of the driver. However, it is only required that the vibration component be able to be extracted, and the cutoff frequencies ωhj and as ωhc are not limited to 3 Hz. For example, when the vibration occurs at 30 Hz, the cutoff frequencies ωhj and ωhc may be set to 10 Hz so as to enable the vibration at 30 Hz to be extracted. Moreover, it is not always required that the cutoff frequencies ωhj and ωhc be the same, and, for example, ωhj may be set to 3 Hz, and ωhc may be set to 5 Hz. Even in this case, 3 Hz and 5 Hz are frequencies close to each other, and similar frequency components can thus be extracted.

(2) Modification Example 1 of Configurations of Filters

The filters Hj(s) and Hc(s) are constructed by the same filters. However, it is only required that the filters be able to extract the frequency component of the steering of the driver, and it is not always required that the filters be the same. For example, the cutoff frequencies ωhj and ωhc may be the same, the filter Hj(s) may be a first-order high-pass filter, and the filter Hc(s) may be a second-order high-pass filter. Moreover, the filter Hj(s) may be a first-order high-pass filter, and the filter Hc(s) may be set as a first-order high-pass filter to which a first-order low-pass filter for removing sensor noise is added. Also in those cases, main frequency components that can be extracted by the filters Hj(s) and Hc(s) are similar frequency components.

Similarly, it is only required that the filters Lj(s) and Lc(s) be able to extract the frequency component of the steering of the driver, and it is not always required that those filters be the same.

(3) Modification Example 2 of Configurations of Filters

The filters Hc(s) and Lc(s) are not limited to the combination of the high-pass filter and the low-pass filter, but may be set as a combination of, for example, a band-pass filter and a band-elimination filter as given by Expression (25).

$$\begin{cases} H_c(s) = \dfrac{k_b s}{s^2 + 2\zeta\omega_b s + \omega_b^2} \\ L_c(s) = 1 - H_c(s) \end{cases} \quad (25)$$

In this expression, s represents a differential operator of Laplace transform,
kb represents a proportional gain,
ωb represents a filter angular frequency, and
ζ represents a filter attenuation coefficient.

In general, in the electric power steering apparatus, a gain decreases in a high frequency band equal to or higher than several tens of hertz in a transmission characteristic from the output torque of the motor 1 to the steering torque Trq detected by the torque sensor 102. Therefore, a vibration caused by the estimation error Δθ of the high frequency component equal to or higher than several tens of hertz is small, and the influence of the vibration on the steering is small. Thus, the vibration is negligible.

Figure 16A:
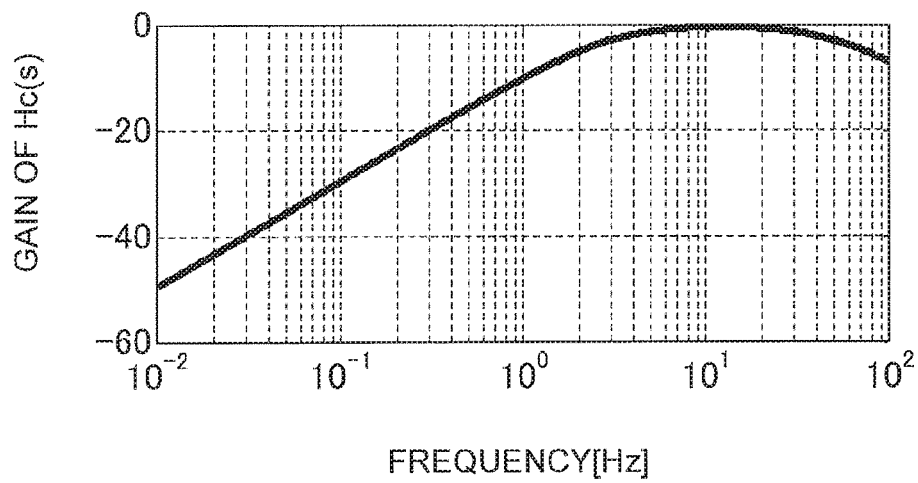
FIG. 16A and FIG. 16B are graphs for showing an example of the gain characteristics of a filter Hc(s) and a filter Lc(s) in a modification example of the third embodiment of the present invention.
Figure 16B:
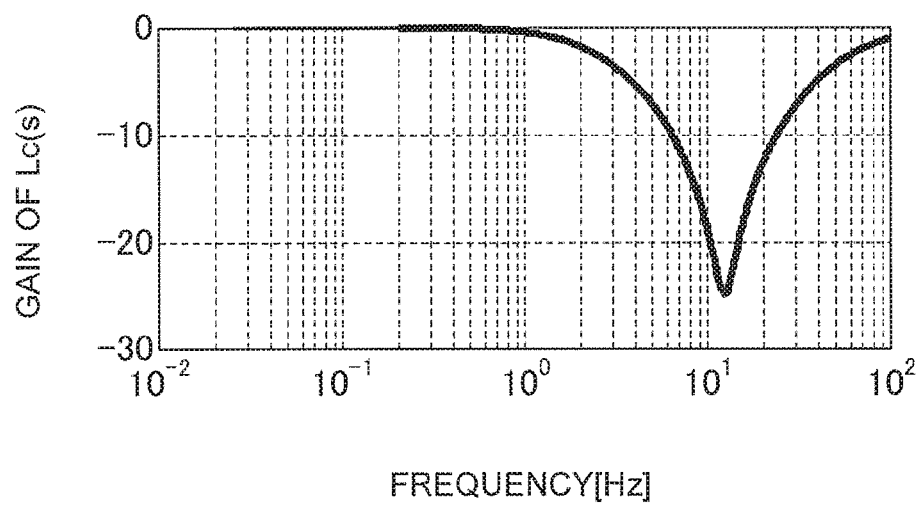

Thus, for example, the filter Hc(s) set as the band-pass filter has a frequency band equal to or lower than 50 Hz, at which the vibration is large, as a pass band. Further, the filter Hc(s) has a frequency band equal to or higher than 3 Hz as the pass band as a frequency component higher than the frequency of the usual steering of the driver. FIGS. 16A and 16B are Bode diagrams for showing an example of gain characteristics of the filter Hc(s) and the filter Lc(s) in a modification example of the third embodiment. The pass band of the filter Hc(s) is set to the frequency higher than the frequency of the steering of the driver, and hence a frequency component extracted by the filter Lc(s) given by Expression (25) contains the frequency component of the steering of the driver.

Further, when such a band-pass filter is set as the filter Hc(s), such an additional effect that appropriate correction aiming at a frequency having a large vibration can be made is provided in addition to the effect of the third embodiment. Moreover, sensor noise and a detection delay of the torque sensor 102 exist, and hence influence thereof can be removed by the band-pass filter.

The same applies to the filters Hj(s) and Lj(s) in terms of whether or not the frequency component of the steering of the driver is contained, and hence the filters Hj(s) and Lj(s) may similarly be set as a combination of a band-pass filter and a band-elimination filter.

Moreover, a control portion including the coordinate conversion unit 32, the voltage command calculation unit 33, and the current command calculation unit 35 of the electric power supply unit 3, the estimated speed calculation unit 4, the estimated speed correction unit 5, and the estimated angle calculation unit 6 of the ECU 2 of FIG. 2 may be constructed by individual control circuits, or may altogether be constructed by one control circuit.

Regarding this point, each of the processing circuits for implementing those functions may be constructed by dedicated hardware or a central processing unit (CPU, also referred to as "central processor", "processor", "arithmetic unit", "microprocessor", "microcomputer", and "DSP") for executing a program stored in a memory.

Figure 17A:
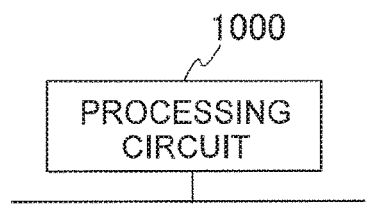
FIG. 17A and FIG. 17B are schematic diagrams for illustrating examples of hardware configurations of a control portion of the electric power steering apparatus according to the present invention.
Figure 17B:
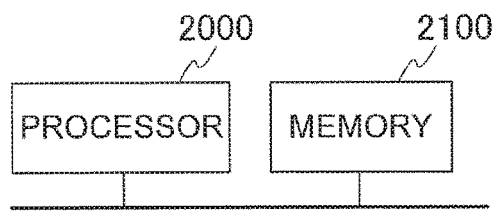

FIG. 17A and FIG. 17B are diagrams for schematically illustrating respective hardware configurations in a case where those functions are constructed by hardware and a case where those functions are constructed by software.

When the functions of the respective components described above are implemented by the hardware illustrated in FIG. 17A, a processing circuit 1000 corresponds to, for example, a single circuit, a composite circuit, a programmed processor, a parallel-programmed processor, an ASIC, an FPGA, or a combination thereof. The function of each of the components may be implemented by a processing circuit, or the functions of the respective components may be implemented collectively by a processing circuit.

When the functions of the respective components described above are implemented by a CPU illustrated in FIG. 17B, the function of each of the components is implemented by software, firmware, or a combination of software and firmware. The software and the firmware are written as programs, and stored in a memory 2100, A processor 2000 serving as a processing circuit reads out and executes the program stored in the memory 2100, to thereby implement the function of each component. It is also understood that those programs cause the computer to execute procedures and methods for the respective components described above. In this case, the memory 2100 corresponds to, for example, a RAM, a ROM, a flash memory, an EPROM, an EEPROM, or other such non-volatile or volatile semiconductor memory, or corresponds to a magnetic disk, a flexible disk, an optical disc, a compact disc, a MiniDisk, or a DVD.

Some parts of the respective functions of the respective components described above may be implemented by dedicated hardware, and other parts may be implemented by software or firmware.

As described above, the processing circuit can implement the respective functions described above by hardware, software, firmware, or a combination thereof.

Moreover, various types of information required for the processing is set in the circuit in advance in the case of the hardware configuration, and is stored in the memory in advance in the case of the software configuration.

Note that, the present invention is not limited to each of the above-mentioned embodiments, and includes all possible combinations of those embodiments.

As described above, according to the present invention, there is provided an electric power steering apparatus including: a steering torque detection unit (102) configured to detect a steering torque (Trq) of a driver; a motor (1) configured to assist a steering force of the driver; an estimated speed calculation unit (4) configured to calculate an estimated speed ($\omega$), which is an estimated value of a rotation speed of the motor; an estimated speed correction unit (5) configured to correct the estimated speed ($\omega$) based on the steering torque (Trq); an estimated angle calculation unit (6) configured to calculate an estimated angle ($\theta$) of the motor by integrating the estimated speed ($\omega$g) after the correction; and an electric power supply unit (3) configured to supply electric power to the motor based on the estimated angle ($\omega$), wherein the estimated speed correction unit (5) is configured to correct the estimated speed ($\omega$) when a determination signal (Tdj), which is based on a value obtained by removing (Hj(s)) a frequency component of steering of the driver from a derivative (Td, s·Trq) of the steering torque, the steering torque (Trq), and the estimated speed ($\omega$) have the same signs.

Further, there is provided a method of controlling an electric power steering apparatus, the method including: calculating an estimated speed ($\omega$), which is an estimated value of a rotation speed of a motor (1) configured to assist a steering force of a driver; correcting the estimated speed ($\omega$) based on a detected steering torque (Trq) of the driver; calculating an estimated angle ($\theta$) of the motor by integrating the estimated speed ($\omega$g) after the correction; and supplying electric power to the motor based on the estimated angle ($\theta$), wherein the estimated speed ($\omega$) is corrected when a determination signal (Tdj), which is based on a value obtained by removing (Hj(s)) a frequency component of steering of the driver from a derivative (Td, s·Trq) of the steering torque, the steering torque (Trq), and the estimated speed ($\omega$) have the same signs.

With this configuration, it can be determined that estimation errors currently occur in the estimated speed and the estimated angle when the determination signal, which based on the value obtained by removing the frequency component of the steering by the driver from the derivative of the steering torque, the steering torque, and an estimated speed have the same signs.

The direction of the steering by the driver and an increase and a decrease in the steering torque can be recognized from the sign of the steering torque and the sign of the derivative of the steering torque. Thus, when the sign of the steering torque and the sign of the derivative of the steering torque are the same signs, it can be determined that the magnitude of the steering torque is increasing.

Further, when the sign of the determination signal obtained by removing the frequency component of the steering of the driver from the derivative of the steering torque and the sign of the estimated speed are the same signs, it can be determined that the torque of the motor is reduced by an increase in an error in the estimated angle due to the error in the estimated speed, and the steering torque is consequently increased. This determination is based on such a fact that the derivative of the steering torque and the rotation speed of the motor correlate with each other, and positive and negative signs thereof are opposite to each other in a frequency band higher than the frequency of the steering of the driver. That is, when the signs are the same signs, it can be determined that the estimated speed contains an error. In addition, through use of the value obtained by removing the frequency component of the steering of the driver from the derivative of the steering torque as the determination signal, a change in the torque of the motor contained in the detected steering torque can be extracted, and hence it can be distinguished for the determination whether the increase in the detected steering torque is caused by an increase in a force of the driver or a decrease in the torque of the motor.

The increase in the error in the estimated angle can be determined by the above-mentioned determination, and hence the error in the estimated angle can be reduced by correcting the estimated speed. The error in the estimated angle can be reduced, and hence a torque fluctuation caused by the error in the estimated angle can be suppressed. Therefore, the electric power steering apparatus capable of achieving stable sensorless control with a small vibration can be provided.

Further, the estimated speed correction unit (5) is configured to correct the estimated speed ($\omega$) when the determination signal (Tdj), which is based on the value obtained by removing (Hj(s)) the frequency component of the steering of the driver from the derivative (Td, s·Trq) of the steering torque, the steering torque (Trq), and the estimated speed ($\omega$) have the same signs, and a magnitude of the determination signal (Tdj) is larger than a set threshold value.

With this configuration, it can be determined whether or not the steering torque has greatly changed due to the estimation error by determining whether or not the magnitude of the determination signal is larger than the threshold value set in advance, and the accuracy of the determination increases.

Further, the estimated speed correction unit (5) is configured to correct the estimated speed ($\omega$) to zero.

With this configuration, when the correction condition is satisfied, the estimated speed contains an error and the estimated speed is higher than the actual speed, and hence, by setting the estimated speed to zero, it is possible to prevent a state in which the erroneous estimated speed is integrated and the error of the estimated angle consequently increases.

Further, the estimated speed correction unit (5) is configured to correct the estimated speed ($\omega$) through use of a correction signal ($\omega$c) obtained by multiplying the derivative (Td, s·Trq) of the steering torque by a conversion gain (k).

With this configuration, the rotation speed of the motor and the derivative of the steering torque correlate with each other, and hence this correlation is used so as to be able to make a more accurate correction.

Further, the estimated speed correction unit (5) is configured to correct the estimated speed (ω) through use of a sum (ωc) of a first correction signal (ωc1) calculated from the derivative (Td, s·Trq) of the steering torque and a second correction signal (ωc2) calculated from the estimated speed (ω).

With this configuration, while the basic component of the estimated speed is used, the estimation error of the frequency component caused by the vibration can be corrected based on the value calculated from the steering torque, and hence a more accurate correction can be made.

Further, the first correction signal (ωc1) is calculated by multiplying the value obtained by removing (Hc(s)) the frequency component of the steering of the driver from the derivative (Td, s·Trq) of the steering torque by a conversion gain (k), and the second correction signal (ωc2) is calculated by extracting (Lc(s)) the frequency component of the steering of the driver from the estimated speed (ω).

With this configuration, while the basic component of the estimated speed is used, the estimation error that is caused by the vibration and has momentarily changed can be corrected based on the value calculated from the steering torque. Further, the rotation speed of the motor and the derivative of the steering torque correlate with each other, and hence a more accurate correction can be made.

Further, the estimated speed correction unit (5) is configured to correct the estimated speed (ω) until a set period elapses when the determination signal (Tdj), which is based on the value obtained by removing (Hj(s)) the frequency component of the steering of the driver from the derivative (Td, s·Trq) of the steering torque, the steering torque (Trq), and the estimated speed (ω) have the same signs.

With this configuration, the correction is not momentary, but the correction can be continued until the effect of the correction sufficiently appears by continuing the correction until the period set in advance elapses.

Further, the estimated speed correction unit (5) is configured to correct the estimated speed (ω) until a correction release condition based on the derivative (Td, s·Trq) of the steering torque is satisfied when the determination signal (Tdj), which is based on the value obtained by removing (Hj(s)) the frequency component of the steering of the driver from the derivative (Td, s·Trq) of the steering torque, the steering torque (Trq), and the estimated speed (ω) have the same signs.

With this configuration, the increase and the decrease in the estimation error appear in the steering torque, and hence it is possible to determine whether or not the effect of the correction appears based on the derivative of the steering torque. Thus, the correction can be continued until the effect of the correction appears.

INDUSTRIAL APPLICABILITY

The electric power steering apparatus and the method of controlling an electric power steering according to the present invention can be applied to many models of electric power steering apparatus.

REFERENCE SIGNS LIST

1 motor, 2 ECU, 3 electric power supply unit, 4 estimated speed calculation unit, 5 estimated speed correction unit, 6 estimated angle calculation unit, 31 inverter, 32 coordinate conversion unit, 33 voltage command calculation unit, 34 current detector, 35 current command calculation unit, 41 angle-equivalent signal calculation unit, 42 differentiation calculation unit, 51 correction determination unit, 52 correction execution unit, 53 correction signal calculation unit, 101 steering wheel, 102 torque sensor, 103 steering shaft, 104 wheel, 105 rack-and-pinion gear, 1000 processing circuit, 2000 processor, 2100 memory.

The invention claimed is:

1. An electric power steering apparatus, comprising:
   a steering torque detector to detect a steering torque of a driver;
   a motor to assist a steering force of the driver;
   an estimated speed calculator to calculate an estimated speed, which is an estimated value of a rotation speed of the motor;
   an estimated speed corrector to correct the estimated speed based on the steering torque;
   an estimated angle calculator to calculate an estimated angle of the motor by integrating the estimated speed after the correction; and
   an electric power supply to supply electric power to the motor based on the estimated angle,
   wherein the estimated speed corrector corrects the estimated speed when a determination signal, which is based on a value obtained by removing a frequency component of steering of the driver from a derivative of the steering torque, the steering torque, and the estimated speed have the same signs.

2. The electric power steering apparatus according to claim 1, wherein the estimated speed corrector corrects the estimated speed when the determination signal, which is based on the value obtained by removing the frequency component of the steering of the driver from the derivative of the steering torque, the steering torque, and the estimated speed have the same signs, and a magnitude of the determination signal is larger than a set threshold value.

3. The electric power steering apparatus according to claim 2, wherein the estimated speed corrector corrects the estimated speed to zero.

4. The electric power steering apparatus according to claim 2, wherein the estimated speed corrector corrects the estimated speed through use of a correction signal obtained by multiplying the derivative of the steering torque by a conversion gain.

5. The electric power steering apparatus according to claim 2, wherein the estimated speed corrector corrects the estimated speed through use of a sum of a first correction signal calculated from the derivative of the steering torque and a second correction signal calculated from the estimated speed.

6. The electric power steering apparatus according to claim 5,
   wherein the first correction signal is calculated by multiplying the value obtained by removing the frequency component of the steering of the driver from the derivative of the steering torque by a conversion gain, and
   wherein the second correction signal is calculated by extracting the frequency component of the steering of the driver from the estimated speed.

7. The electric power steering apparatus according to claim 2, wherein the estimated speed corrector corrects the estimated speed until a set period elapses when the determination signal, which is based on the value obtained by removing the frequency component of the steering of the driver from the derivative of the steering torque, the steering torque, and the estimated speed have the same signs.

8. The electric power steering apparatus according to claim 2, wherein the estimated speed corrector corrects the estimated speed until a correction release condition based on the derivative of the steering torque is satisfied when the determination signal, which is based on the value obtained by removing the frequency component of the steering of the driver from the derivative of the steering torque, the steering torque, and the estimated speed have the same signs.

9. The electric power steering apparatus according to claim 1, wherein the estimated speed corrector corrects the estimated speed to zero.

10. The electric power steering apparatus according to claim 9, wherein the estimated speed corrector corrects the estimated speed until a set period elapses when the determination signal, which is based on the value obtained by removing the frequency component of the steering of the driver from the derivative of the steering torque, the steering torque, and the estimated speed have the same signs.

11. The electric power steering apparatus according to claim 9, wherein the estimated speed corrector corrects the estimated speed until a correction release condition based on the derivative of the steering torque is satisfied when the determination signal, which is based on the value obtained by removing the frequency component of the steering of the driver from the derivative of the steering torque, the steering torque, and the estimated speed have the same signs.

12. The electric power steering apparatus according to claim 1, wherein the estimated speed corrector corrects the estimated speed through use of a correction signal obtained by multiplying the derivative of the steering torque by a conversion gain.

13. The electric power steering apparatus according to claim 12, wherein the estimated speed corrector corrects the estimated speed until a set period elapses when the determination signal, which is based on the value obtained by removing the frequency component of the steering of the driver from the derivative of the steering torque, the steering torque, and the estimated speed have the same signs.

14. The electric power steering apparatus according to claim 12, wherein the estimated speed corrector corrects the estimated speed until a correction release condition based on the derivative of the steering torque is satisfied when the determination signal, which is based on the value obtained by removing the frequency component of the steering of the driver from the derivative of the steering torque, the steering torque, and the estimated speed have the same signs.

15. The electric power steering apparatus according to claim 1, wherein the estimated speed corrector corrects the estimated speed through use of a sum of a first correction signal calculated from the derivative of the steering torque and a second correction signal calculated from the estimated speed.

16. The electric power steering apparatus according to claim 15,
wherein the first correction signal is calculated by multiplying the value obtained by removing the frequency component of the steering of the driver from the derivative of the steering torque by a conversion gain, and
wherein the second correction signal is calculated by extracting the frequency component of the steering of the driver from the estimated speed.

17. The electric power steering apparatus according to claim 1, wherein the estimated speed corrector corrects the estimated speed until a set period elapses when the determination signal, which is based on the value obtained by removing the frequency component of the steering of the driver from the derivative of the steering torque, the steering torque, and the estimated speed have the same signs.

18. The electric power steering apparatus according to claim 1, wherein the estimated speed corrector corrects the estimated speed until a correction release condition based on the derivative of the steering torque is satisfied when the determination signal, which is based on the value obtained by removing the frequency component of the steering of the driver from the derivative of the steering torque, the steering torque, and the estimated speed have the same signs.

19. A method of controlling an electric power steering apparatus, the method comprising:
calculating an estimated speed, which is an estimated value of a rotation speed of a motor configured to assist a steering force of a driver;
correcting the estimated speed based on a detected steering torque of the driver;
calculating an estimated angle of the motor by integrating the estimated speed after the correction; and
supplying electric power to the motor based on the estimated angle,
wherein the estimated speed is corrected when a determination signal, which is based on a value obtained by removing a frequency component of steering of the driver from a derivative of the steering torque, the steering torque, and the estimated speed have the same signs.

* * * * *